US009007462B2

(12) United States Patent
Mitsugi

(10) Patent No.: US 9,007,462 B2
(45) Date of Patent: Apr. 14, 2015

(54) DRIVING ASSIST APPARATUS, DRIVING ASSIST SYSTEM, AND DRIVING ASSIST CAMERA UNIT

(75) Inventor: Tatsuya Mitsugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 371 days.

(21) Appl. No.: 13/698,227

(22) PCT Filed: Jun. 18, 2010

(86) PCT No.: PCT/JP2010/004085

§ 371 (c)(1), (2), (4) Date: Nov. 15, 2012

(87) PCT Pub. No.: WO2011/158304

PCT Pub. Date: Dec. 22, 2011

(65) Prior Publication Data

US 2013/0057690 A1 Mar. 7, 2013

(51) Int. Cl.
*H04N 7/18* (2006.01)
*G08G 1/16* (2006.01)

(52) U.S. Cl.
CPC ................ *G08G 1/168* (2013.01); *G08G 1/166* (2013.01)

(58) Field of Classification Search
USPC ......... 348/148, 143, 142, 136, 118, 153, 159, 348/14.12, 36, 46, 49, 51, 54, 64, 202, 348/208.11, 222.1, 231.3, 231.6, 231.9, 348/333.01, 333.02, 333.1, 335, 425.1, 563, 348/571, 714, 744, 806, 837; 382/104, 106; 340/425.1, 441; 701/1, 36, 41
See application file for complete search history.

(56) References Cited

U.S. PATENT DOCUMENTS

| | | | | |
|---|---|---|---|---|
| 5,687,249 | A * | 11/1997 | Kato | 382/104 |
| 2002/0003571 | A1* | 1/2002 | Schofield et al. | 348/148 |
| 2002/0123829 | A1* | 9/2002 | Kuriya et al. | 701/1 |
| 2003/0021490 | A1 | 1/2003 | Okamoto et al. | |
| 2003/0095182 | A1* | 5/2003 | Imoto | 348/148 |
| 2003/0179293 | A1* | 9/2003 | Oizumi | 348/148 |
| 2005/0082462 | A1* | 4/2005 | Yanai | 250/208.1 |
| 2005/0083405 | A1* | 4/2005 | Imoto et al. | 348/148 |
| 2005/0083427 | A1 | 4/2005 | Imoto | |
| 2005/0113994 | A1* | 5/2005 | Bell et al. | 701/35 |
| 2006/0066835 | A1 | 3/2006 | Laufer et al. | |
| 2006/0287826 | A1* | 12/2006 | Shimizu et al. | 701/216 |

(Continued)

FOREIGN PATENT DOCUMENTS

| | | | |
|---|---|---|---|
| DE | 10 2004 043 236 | A1 | 5/2005 |
| DE | 10 2004 048 185 | B4 | 9/2006 |

(Continued)

*Primary Examiner* — Jefferey Harold
*Assistant Examiner* — Mustafizur Fahman
(74) *Attorney, Agent, or Firm* — Birch, Stewart, Kolasch & Birch, LLP

(57) ABSTRACT

A driving assist apparatus acquires vehicle information which includes a gear state and speed of a vehicle; judges a state of preparing for movement, a state of starting movement, and a state during movement; generates a wide-angle image that is an image that can see a wide range although having distortion when the vehicle state is the state of preparing for movement or the state of starting movement; and generates a no-distortion image that is an image in which the distortion due to the lens shape and the distortion by the projection system are eliminated from the camera image when the vehicle state is the state during movement.

10 Claims, 16 Drawing Sheets

(56) References Cited

U.S. PATENT DOCUMENTS

| | | | | |
|---|---|---|---|---|
| 2007/0010918 | A1* | 1/2007 | Shimazaki et al. | 701/1 |
| 2007/0088478 | A1* | 4/2007 | Mori et al. | 701/41 |
| 2007/0146166 | A1* | 6/2007 | Sato et al. | 340/932.2 |
| 2008/0174452 | A1* | 7/2008 | Yamamoto et al. | 340/932.2 |
| 2008/0186156 | A1* | 8/2008 | Uematsu et al. | 340/441 |
| 2009/0059006 | A1 | 3/2009 | Hattori et al. | |
| 2009/0107140 | A1* | 4/2009 | Pursifull | 60/600 |
| 2009/0112389 | A1 | 4/2009 | Yamamoto et al. | |
| 2009/0242345 | A1* | 10/2009 | Nakagawara et al. | 192/3.58 |
| 2010/0002071 | A1* | 1/2010 | Ahiska | 348/36 |
| 2010/0019934 | A1* | 1/2010 | Takano | 340/932.2 |
| 2010/0049402 | A1* | 2/2010 | Tanaka | 701/41 |
| 2010/0111367 | A1* | 5/2010 | Hiraoka | 382/106 |

FOREIGN PATENT DOCUMENTS

| | | | |
|---|---|---|---|
| DE | 10 2008 038 463 | A1 | 3/2009 |
| EP | 1 303 140 | A1 | 4/2003 |
| JP | 2000-127874 | A | 5/2000 |
| JP | 2003-134507 | A | 5/2003 |
| JP | 2003-158736 | A | 5/2003 |
| JP | 2005-236493 | A | 9/2005 |
| JP | 2007-522981 | A | 8/2007 |
| JP | 2008-13022 | A | 1/2008 |
| JP | 2008-149879 | A | 7/2008 |

* cited by examiner

DRIVING ASSIST APPARATUS, DRIVING ASSIST SYSTEM, AND DRIVING ASSIST CAMERA UNIT

TECHNICAL FIELD

The present invention relates to a driving assist apparatus which assists driving by making a driver visually check circumstances surrounding a vehicle in the case of moving a stopped vehicle backward or forward.

BACKGROUND ART

A driving assist apparatus images circumstances surrounding a vehicle by a camera attached to the vehicle and changes an imaged camera image according to a state of the vehicle so as to be displayed. For example, there is a driving assist apparatus (Patent Document 1) in which circumstances surrounding a vehicle are imaged by a plurality of cameras, images of the number of viewpoints corresponding to the number of cameras are displayed so that a driver easily grasps the surrounding circumstances when the vehicle stops, and the images imaged by the respective cameras are synthesized to an image of one viewpoint to be displayed so that the driver easily understands the display when the vehicle moves. Furthermore, there is a driving assist apparatus (Patent Document 2) in which a virtual camera is set at a position different from the position of an actual camera, an angle of view of the virtual camera is set large when a steering angle of a handle is large, and the angle of view of the virtual camera is set small when the steering angle of the handle is small; and accordingly, a distance to an obstacle during movement of a vehicle is easily grasped.

RELATED ART DOCUMENT

Patent Document

Patent Document 1: Japanese Unexamined Patent Publication No. 2005-236493

Patent Document 2: Japanese Unexamined Patent Publication No. 2008-149879

DISCLOSURE OF THE INVENTION

Problems to be Solved by the Invention

Since the driving assist apparatus of Patent Document 1 switches from a plurality of viewpoints to an image of one viewpoint upon and immediately after starting movement of the vehicle, confirmation of surroundings is difficult upon and immediately after the starting movement. Thus, a problem exists in that the vehicle cannot be slowly moved while confirming the circumstances surrounding the vehicle. Furthermore, since the driving assist apparatus of Patent Document 2 displays an image with a small angle of view when starting movement in a state where the steering angle of the handle is small, a problem exists in that confirmation of the surrounding circumstances is difficult regardless of the time when the vehicle starts movement. As described above, the driving assist apparatuses according to Patent Documents 1 and 2 do not properly switch the display of the image according to the circumstances of the vehicle.

Consequently, an object of the present invention is to provide a driving assist apparatus capable of displaying an image that can confirm a wide range of a road surface in a direction in which a vehicle moves before starting movement of the vehicle and for a predetermined period of time from starting movement, and an image that is susceptible to grasping a sense of distance after a predetermined period of time elapses from starting movement of the vehicle.

Means for Solving the Problems

According to the present invention, there is provided a driving assist apparatus which is connected to a camera attached to a vehicle and having a wide-angle lens for imaging a road surface in a direction in which the vehicle moves, and displays on a display device an image based on a camera image that is an image imaged by the camera, the driving assist apparatus including: an information storing section which stores information for generating images, the information including lens distortion information that shows distortion of the camera image due to a lens shape of the camera and projection information that shows distortion of the camera image by a projection system of the wide-angle lens; a vehicle information acquisition section which acquires vehicle information including a gear state that is a state of a transmission of the vehicle and speed; a vehicle state judgment section which judges a vehicle state that is a state of the vehicle based on the vehicle information; and an image generation section which processes the camera image according to the vehicle state using the information for generating images, and generates an image to be displayed on the display device. The vehicle state judgment section judges: a state of preparing for movement, which is a state where the vehicle is movable and stops; a state of starting movement, which is a state until a predetermined condition during movement is established from starting movement and where the vehicle moves; and a state during movement, which is a state where the vehicle moves after the condition during movement is established, as the vehicle state. The image generation section generates a wide-angle image that is an image that can see a wide range although having distortion when the vehicle state is the state of preparing for movement or the state of starting movement, and generates a no-distortion image that is an image in which the distortion due to the lens shape and the distortion by the projection system are eliminated from the camera image when the vehicle state is the state during movement.

According to the present invention, there is provided a driving assist camera unit which images an image of a road surface in a direction in which a vehicle moves, and displays on a display device an image based on an imaged camera image, the driving assist camera unit including: a camera attached to the vehicle and having a wide-angle lens for imaging the road surface; an information storing section which stores information for generating images, the information including lens distortion information that shows distortion of the camera image due to a lens shape of the camera and projection information that shows distortion of the camera image by a projection system of the wide-angle lens; a vehicle information acquisition section which acquires vehicle information including a gear state that is a state of a transmission of the vehicle and speed; a vehicle state judgment section which judges a vehicle state that is a state of the vehicle based on the vehicle information; and an image generation section which processes the camera image according to the vehicle state using the information for generating images, and generates an image to be displayed on the display device. The vehicle state judgment section judges: a state of preparing for movement, which is a state where the vehicle is movable and stops; a state of starting movement, which is a state until a predetermined condition during movement is established from starting movement and where the vehicle moves; and a state during movement, which is a state where the vehicle moves after the condition during movement is established, as the vehicle state. The image generation section generates a wide-angle image that is an image that can see a wide range although having distortion when the vehicle state is the state of preparing for movement or the state of starting movement, and generates a no-distortion image that is an image in which the distortion due to the lens shape and the distortion by the projection system are eliminated from the camera image when the vehicle state is the state during movement.

Advantageous Effect of the Invention

According to the present invention, an image capable of confirming a wide range of a road surface in a direction in which a vehicle moves can be displayed before starting movement of the vehicle and for a predetermined period of time from starting movement, and an image susceptible to grasping a sense of distance can be displayed after a predetermined period of time elapses from starting movement of the vehicle.

MODES FOR CARRYING OUT THE INVENTION

Embodiment 1

Figure 1:
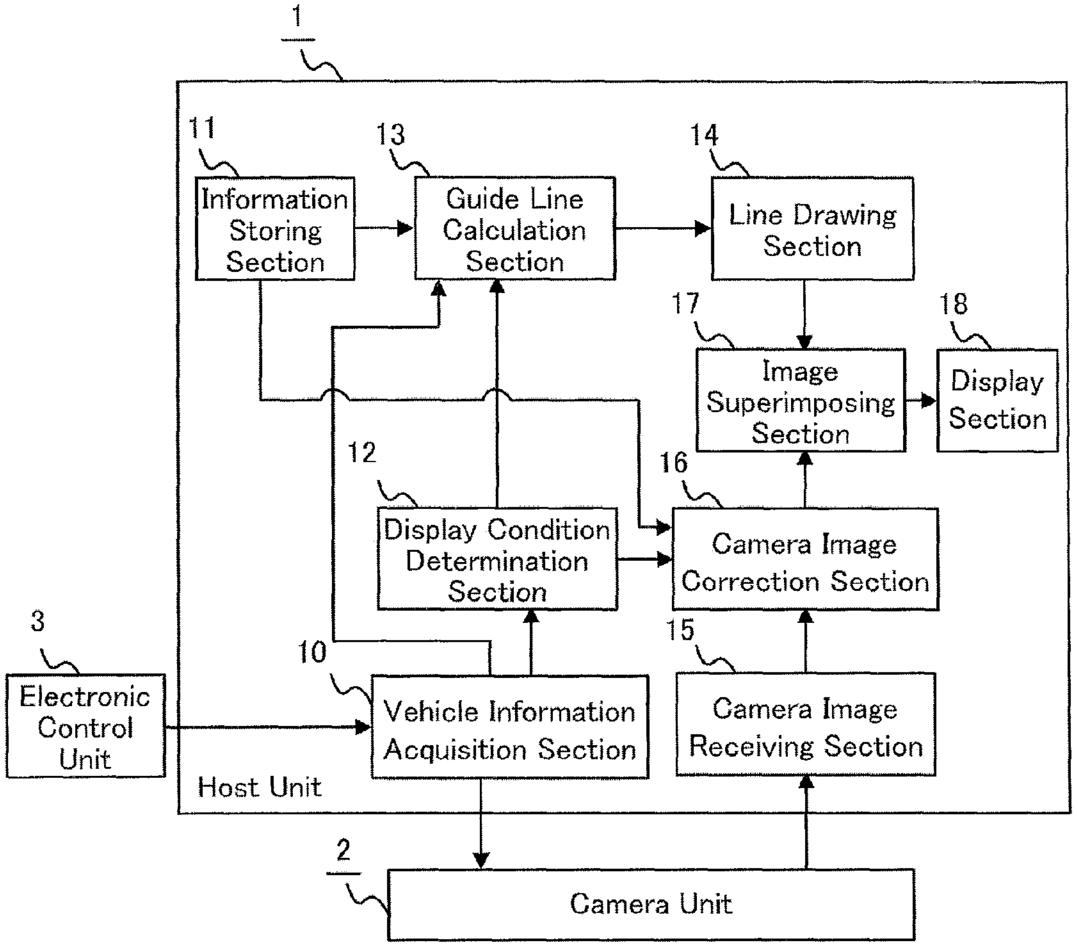
FIG. 1 is a block diagram showing the configuration of a driving assist system according to Embodiment 1.

FIG. 1 is a block diagram showing the configuration of a driving assist system according to Embodiment 1. In FIG. 1, the driving assist system is configured by including a host unit 1 serving as a driving assist apparatus and a camera unit 2. An electronic control unit 3 is an electric control unit (ECU), which is generally mounted on a vehicle and controls electronic devices equipped on a vehicle by an electronic circuit, and the electronic control unit 3 is a vehicle information output device which detects vehicle information and outputs the same to the host unit 1. The vehicle information output device in the present embodiment outputs vehicle information to the host unit 1, the vehicle information including particularly gear state information showing the position of a select lever operated by the operation of a driver to change a state of a transmission of the vehicle (hereinafter, referred to as a "gear state"), speed information showing speed of the vehicle, acceleration information showing acceleration of the vehicle, movement distance information showing a movement distance of the vehicle at one cycle at which the vehicle information is detected, and parking brake information showing the position of a parking brake, and the like. The vehicle is an automatic transmission (AT) vehicle which does not require a driver to operate a clutch.

A navigation device which guides a route to the destination is widely mounted on an automobile (vehicle). In the navigation devices, one type is previously mounted on a vehicle and another type is sold separately from a vehicle so as to be mounted on the vehicle. Thus, a terminal for outputting the vehicle information is provided on the ECU so that a commercially available navigation device can be attached. Therefore, the driving assist system according to the present embodiment can acquire the vehicle information by connecting the host unit 1 to the output terminal. Incidentally, the host unit 1 may be integrated with the navigation device; alternatively the host unit 1 may be separated from the navigation device.

The host unit 1 superimposes a guide line image that is an image of guide lines set at a predetermined position behind the vehicle with respect the vehicle, on a camera image that is an image surrounding (more particularly, behind) the vehicle and being imaged by a camera having a wide-angle lens serving as an imaging section in which the camera unit 2 has; and the host unit 1 displays the superimposed image on a display section 18 (display device) such as a monitor in the vehicle interior. A vehicle state regarding movement, which is a state of a vehicle, is judged by the speed of the vehicle, the gear state, and the like; and an image to be displayed according to the judged vehicle state is made to change to facilitate the driver to recognize surrounding circumstances.

The host unit 1 includes: a display section 18 which displays an image; a vehicle information acquisition section 10 which acquires the vehicle information outputted from the electronic control unit 3; an information storing section 11 (guide line information storing section) in which information for calculating guide lines is stored; a display condition determination section 12 (vehicle state judgment section) which generates display condition information which makes the display section 18 display the guide line image and the camera image in what way based on the vehicle information acquired by the vehicle information acquisition section 10; a guide line calculation section 13 (guide line information generation section) which calculates guide line information that is information on the drawing position and shape of the guide lines based on the information stored in the information storing section 11 and the display condition information; a line drawing section 14 (guide line image generation section) which generates the guide line image in which the guide lines are drawn based on the guide line information calculated by the guide line calculation section 13; a camera image receiving section 15 which receives the camera image transmitted from the camera unit 2; a camera image correction section 16 (image generation section) which corrects the camera image received by the camera image receiving section 15 based on the information stored in the information storing section 11 and the display condition information; and an image superimposing section 17 which superimposes the guide line image and the correction camera image by setting the guide line image outputted from the line drawing section 14 and the correction camera image outputted from the camera image correction section 16 to images of different layers. The guide line image and the correction camera image of different layers outputted from the image superimposing section 17 are synthesized to one image to be displayed on the display section 18. Incidentally, the camera image correction section 16 and the image superimposing section 17 constitute image output sections.

When the gear state of the vehicle acquired by the vehicle information acquisition section 10 of the host unit 1 is reverse (backward movement), the host unit 1 operates the camera of the camera unit 2 to control so as to transmit an imaged camera image. By the above-mentioned configuration, an image in which the guide line image generated by the line drawing section 14 is superimposed on the camera image transmitted from the camera unit 2 is displayed on the display section 18; and by confirming this image, the driver of the vehicle can park the vehicle using the guide lines as a criterion while visually checking circumstances behind and surrounding the driving vehicle. Incidentally, when a designation from the driver is made, the image imaged by the camera may be displayed on the display section 18.

Hereinafter, each constitutional element constituting the driving assist apparatus will be described.

In FIG. 1, the following information is stored in the information storing section 11 as guide line calculation information for calculating guide lines to be described later.

(A) Attachment information. Attachment information is information showing that the camera is attached to the vehicle in what way, in other words, information showing an attachment position and an attachment angle of the camera.

(B) Angle of view information. Angle of view information is angle information showing a range of an object to be imaged by the camera of the camera unit 2 and display information showing a display range during displaying the image on the display section 18. The angle information includes the maximum horizontal angle of view Xa and the maximum vertical angle of view Ya or the diagonal angle of view of the camera. The display information includes the maximum horizontal drawing pixel size Xp and the maximum vertical drawing pixel size Yp of the display section 18.

(C) Projection information. Projection information is information showing a projection system of the lens for use in the camera of the camera unit 2. Since a fisheye lens is used as the wide-angle lens in which the camera has in the present embodiment, any of stereographic projection, equidistance projection, equisolid angle projection, and orthographic projection is used as s value of the projection information.

(D) Lens Distortion Information. Lens distortion information is information of the characteristics of the lens on distortion of an image due to the lens.

(E) Viewpoint information. Viewpoint information is information on a different position assumed that the camera is present.

(F) Guide line spacing information. Guideline spacing information is parking width information, vehicle width information, and distance information of a safe distance, a cautious distance, and a warning distance from the rear end of the vehicle. The parking width information is information showing parking width (for example, the width of a parking partition) to which a predetermined margin width is added to the width of the vehicle. The distance information of the safe distance, the cautious distance, and the warning distance from the rear end of the vehicle is a distance facing backward from the rear end of the vehicle and shows a criterion of the distance behind the vehicle, for example, the safe distance is 1 m, the cautious distance is 50 cm, and the warning distance is 10 cm, respectively from the rear end of the vehicle. The driver can grasp as to how much distance there is from the rear end of the vehicle to an obstacle seen behind the vehicle by the safe distance, the cautious distance, and the warning distance, respectively from the rear end of the vehicle.

Incidentally, (C) the projection information, (D) the lens distortion information, and (E) the viewpoint information is also information for generating images used for transforming the camera image imaged by the camera.

Figure 2:
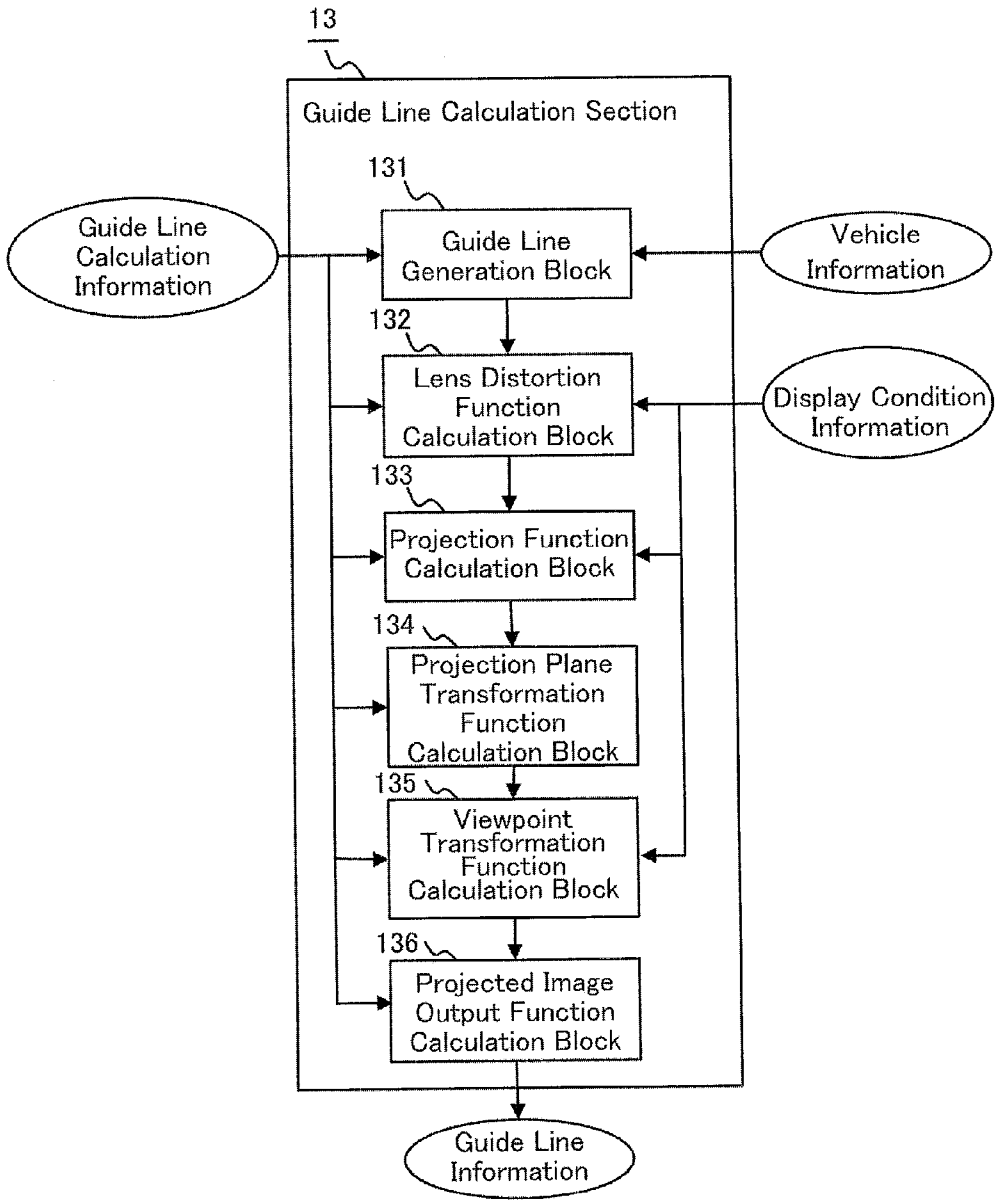
FIG. 2 is a block diagram showing the configuration of a guide line calculation section of the driving assist system according to Embodiment 1.

FIG. 2 is a block diagram showing the configuration of the guide line calculation section 13. The guide line calculation section 13 is configured by including a guide line generation block 131, a lens distortion function calculation block 132, a projection function calculation block 133, a projection plane transformation function calculation block 134, a viewpoint transformation function calculation block 135, and a projected image output function calculation block 136. The lens distortion function calculation block 132, the projection function calculation block 133, and the viewpoint transformation function calculation block 135 may not be operated according to the display condition information. Therefore, for simplicity, description will be made on the case where all of the above-mentioned respective constitutional elements operate first.

Figure 3:
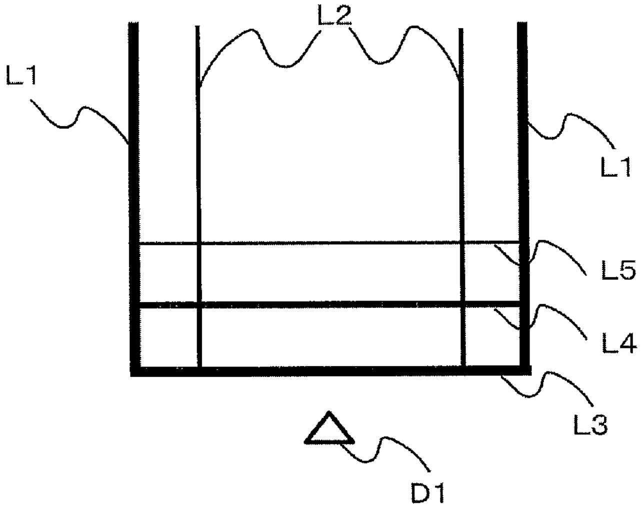
FIG. 3 is an example of guide lines in real space, which is to be calculated by a guide line generation block of the driving assist system according to Embodiment 1.

The guide line generation block 131 virtually sets guide lines on the road surface behind the vehicle based on the guide line spacing information acquired from the information storing section 11 when the gear state information in which the gear state of the vehicle is reverse is inputted from the vehicle information acquisition section 10. FIG. 3 shows an example of the guide lines in real space, which is to be calculated by the guide line generation block 131. In FIG. 3, straight lines L1 are guide lines showing the width of the parking partition, straight lines L2 are guide lines showing the width of the vehicle, and straight lines L3 to L5 are guide lines showing the distance from the rear end of the vehicle. L3 shows the warning distance, L4 shows the cautious distance, and L5 shows the safe distance. The straight lines L1 and L2 begin from the straight line L3 that is the nearest to the vehicle and have the length of approximately equal to or more than the length of the parking partition on the far side from the vehicle. The straight lines L3 to L5 are drawn so as to connect both side straight lines L2. A direction D1 shows a direction in which the vehicle goes into the parking partition. Incidentally, both guide lines of the vehicle width and the parking width are displayed; however, either may be displayed. Furthermore, the guide lines showing the distance from the rear end of the vehicle may be equal to or less than 2 lines or equal to or more than 4 lines. For example, the guide lines may be displayed at the position of the same distance as the length of the vehicle from any of the straight lines L3 to L5. Only the guide lines parallel to the traveling direction of the vehicle (L1 and L2 in FIG. 3) and any of the guide lines showing the distance from the rear end of the vehicle may be displayed. A display pattern (color, thickness, line type, and the like) of the guide lines parallel to the traveling direction of the vehicle may be changed according to the distance from the rear end of the vehicle. When only the guide lines showing the distance from the rear end of the vehicle are displayed, the length thereof may be either the parking width or the vehicle width. When the length of the parking width is displayed, portions corresponding to the vehicle width and partitions other than those may be displayed in a different display pattern.

The guide line generation block 131 outputs finding coordinates of a beginning point and an end point of each guide line shown in FIG. 3. Each function calculation block at a subsequent stage calculates values of coordinates exerting a similar influence as the influence received when imaged by the camera with respect to necessary points on each guide line. The line drawing section 14 generates the guide line image based on the guide line information as a calculated result. Then, the image in which the guide line image is superimposed on the camera image without deviation is displayed on the display section 18. Hereinafter, for simplicity, one coordinates P=(x, y) on the guide lines virtually set on the road surface behind the vehicle shown in FIG. 3 will be described as an example. Incidentally, the coordinates P can be defined as a position on rectangular coordinates in which, for example, a point on the road surface behind the vehicle is regarded as the origin, the point being separated a predetermined distance from the vehicle.

The lens distortion function calculation block 132 transforms to coordinates i(P) subjected to lens distortion by calculating a lens distortion function i( ) determined based on the lens distortion information acquired from the information storing section 11 with respect to the coordinates P showing the guide lines calculated by the guide line generation block 131. The lens distortion function i( ) is one in which distortion to which the camera image is subjected due to the lens shape when an object is imaged by the camera of the camera unit 2 is expressed by a function. The lens distortion function i( ) can be found by, for example, a model of Zhang regarding the lens distortion. In the model of Zhang, the lens distortion is modeled by radiative distortion, and the following calculation is performed.

If (u, v) is regarded as normalized coordinates free from the influence of the lens distortion and (um, vm) is regarded as normalized coordinates under the influence of the lens distortion, the following relationship is established.

$$um=u+u^*(k1^*r^2+k2^*r^4)$$

$$vm=v+v^*(k1^*r^2+k2^*r^4)$$

$$r^2=u^2+u^2$$

where, $k_1$ and $k_2$ are coefficients at the time when the lens distortion due to the radiative distortion is expressed by a polynomial equation and are constants peculiar to the lens.

The following relationship exists between the coordinates P=(x, y) and the coordinates i(P)=(xm, ym) subjected to the lens distortion.

$$xm=x+(x-x_0)^*(k1^*r^2+k2^*r^4)$$

$$ym=y+(y-y_0)^*(k1^*r^2+k2^*r^4)$$

$$r^2=(x-x_0)^2+(y-y_0)^2$$

where, $(x_0, y_0)$ is a point on the road surface corresponding to a principal point serving as the center of the radiative distortion in coordinates free from the influence of the lens distortion. $(x_0, y_0)$ is found from the attachment information of the camera unit 2. Incidentally, in the lens distortion function calculation block 132 and the projection function calculation block 133, an optical axis of the lens is perpendicular to the road surface and passes through the above $(x_0, y_0)$.

The projection function calculation block 133 transforms to coordinates h(i(P)) under the influence due to the projection system (hereinafter, projection distortion) by further calculating a function h( ) by the projection system determined based on the projection information acquired from the information storing section 11 with respect to the coordinates i(P) subjected to the lens distortion outputted from the lens distortion function calculation block 132. The function h( ) by the projection system is represented by a function as to light incident at an angle θ with respect to the lens is focused at a position how far apart from the center of the lens. If a focal distance of the lens is f, an incident angle of the incident light, that is, a half angle of view is θ, and an image height in an imaging area of the camera (the distance between the lens center and the focusing position) is Y, the function h( ) by the projection system calculates the image height Y using any of the following equations for each projection system.

Stereographic projection $Y=2^*f^*\tan(\theta/2)$

Equidistance projection $Y=f^*\theta$

Equisolid angle projection $Y=2^*f^*\sin(\theta/2)$

Orthographic projection $Y=f^*\sin\theta$

The projection function calculation block 133 transforms the coordinates i(P) subjected to the lens distortion outputted from the lens distortion function calculation block 132 to the incident angle θ with respect to the lens, calculates the image height Y by substituting in any of the above projection equations, returns the image height Y to coordinates; and accordingly, the coordinates h(i(P)) subjected to the projection distortion is calculated.

The projection plane transformation function calculation block 134 transforms to coordinates f(h(i(P))) subjected to projection plane transformation by further calculating a projection plane transformation function f( ) determined based on the attachment information acquired from the information storing section 11 with respect to the coordinates h(i(P)) subjected to the projection distortion outputted from the projection function calculation block 133. The projection plane transformation is transformation which exerts an influence according to an attachment state because the image imaged by the camera depends on the attachment state such as the attachment position and the attachment angle of the camera. By this transformation, the respective coordinates showing the guide lines are transformed to coordinates as imaged by the camera attached to the vehicle at the position defined by the attachment information. The attachment information for use in the projection plane transformation function f( ) is a height L of the attachment position of the camera with respect to the road surface, an attachment vertical angle Φ that is a tilt angle of the optical axis of the camera with respect to the vertical line, an attachment horizontal angle θh that is a tilt angle with respect to the center line running the length of the vehicle back and forth, and a distance H from the center of the vehicle width. The projection plane transformation function f ( ) is expressed by a geometry function using such attachment information. Incidentally, the camera does not deviate in a direction of tilt rotation in which the optical axis is regarded as a rotational axis and the camera is properly attached.

The viewpoint transformation function calculation block 135 transforms to coordinates j(f(h(i(P)))) in which viewpoint transformation is performed by further calculating a viewpoint transformation function j ( ) determined based on the viewpoint information acquired from the information storing section 11 with respect to the coordinates f(h(i(P))) subjected to the projection plane transformation outputted from the projection plane transformation function calculation block 134. The image acquired when the object is imaged by the camera is like an image in which the object is seen from the position where the camera is attached. The viewpoint transformation is that this image is transformed to an image as imaged by a camera that is present at a different position (for example, a camera virtually set so as to direct to the road surface at the position of a predetermined height in the road surface behind the vehicle), that is, the image is transformed to an image from a different viewpoint. This viewpoint transformation applies a kind of transformation referred to as affine transformation to the original image. The affine transformation is coordinate transformation in which parallel movement and linear mapping are combined. The parallel movement in the affine transformation corresponds to moving the camera from the attachment position defined by the attachment information to the above different position. The linear mapping corresponds to rotating the camera from a direction defined by the attachment information so as to match with a direction of the camera that is present at the above different position. The viewpoint information is composed of parallel movement information on the difference between the attachment position of the camera and the position of the different viewpoint and rotation information on the difference between the direction defined by the camera attachment information and the direction of the different viewpoint. Incidentally, image transformation for use in the viewpoint transformation is not limited to the affine transformation; but a different kind of transformation may be used.

The projected image output function calculation block 136 transforms to coordinates g(j(f(h(i(P))))) for projected image output by further calculating a projected image output function g( )determined based on the angle of view information acquired from the information storing section 11 with respect to the coordinates j(f(h(i(P)))) subjected to the viewpoint transformation. Since the size of the camera image imaged by the camera is generally different from the size of the image capable of being displayed by the display section 18, the camera image is changed to the size capable of being displayed by the display section 18. Thus, the projected image output function calculation block 136 applies transformation corresponding to the change of the camera image to the size capable of being displayed on the display section 18 with respect to the coordinates j(f(h(i(P)))) subjected to the viewpoint transformation; and accordingly, the camera image can be matched in scale. The projected image output function g( )is expressed by a mapping function which uses the maximum horizontal angle of view Xa and the maximum vertical angle of view Ya of the camera and the maximum horizontal drawing pixel size Xp and the maximum vertical drawing pixel size Yp in projected image output.

Incidentally, in the above description, calculation is performed in the order of the lens distortion function, the projection function, the viewpoint transformation function, the projection plane transformation function, and the projected image output function with respect to the respective coordinates showing the guide lines; however, order for calculating the respective functions may not be this order.

Incidentally, the projection plane transformation function f( ) in the projection plane transformation function calculation block 134 includes the angle of view of the camera (the maximum horizontal angle of view Xa and the maximum vertical angle of view Ya of the camera) as information showing the size of the imaged camera image. Therefore, even when a part of the camera image received by the camera image receiving section 15 is cut out to be displayed, the guide lines can be displayed so as to match with the partly cut out camera image by changing a coefficient of the angle of view of the camera in the projection plane transformation function f( ).

Figure 4:
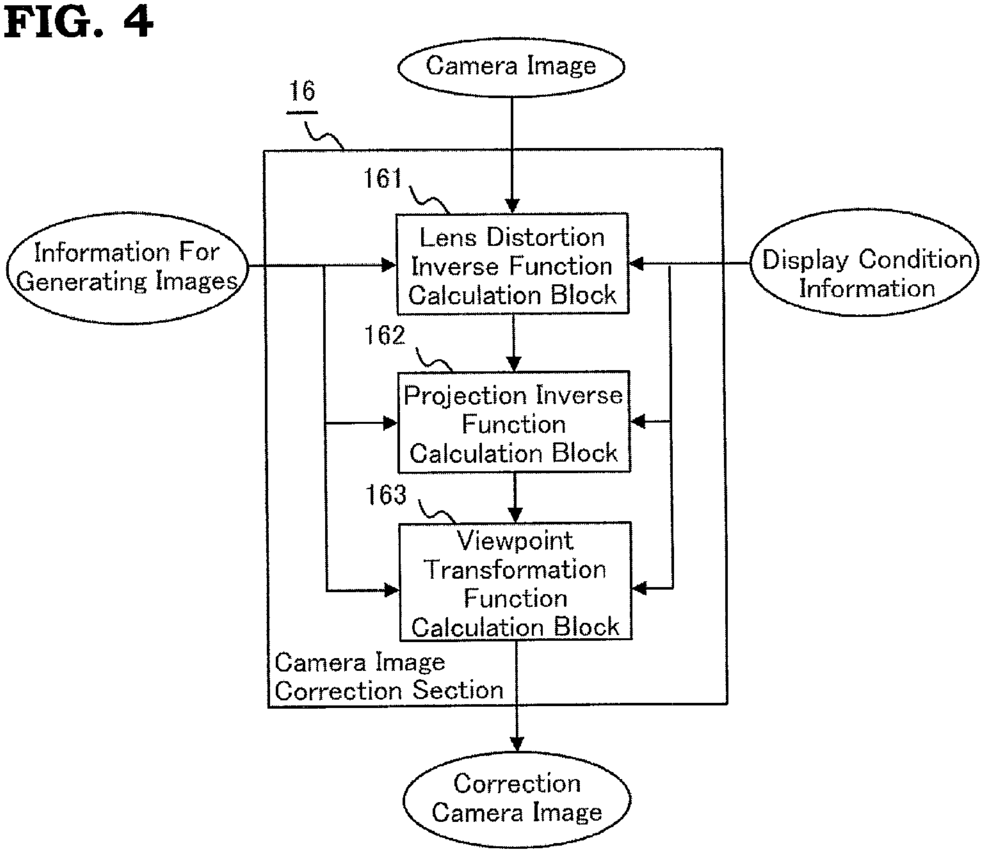
FIG. 4 is a block diagram showing the configuration of a camera image correction section of the driving assist system according to Embodiment 1.

FIG. 4 is a block diagram showing the configuration of the camera image correction section 16. The camera image correction section 16 is configured by including a lens distortion inverse function calculation block 161, a projection inverse function calculation block 162, and a viewpoint transformation function calculation block 163. These configurations may not be operated according to the display condition information. Therefore, for simplicity, description will be made on the case where all of the constitutional elements operate first.

The lens distortion inverse function calculation block 161 finds an inverse function $i^{-1}( )$ of the above-mentioned lens distortion function i( ) based on the lens distortion information included in the information for generating images, and calculates with respect to the camera image. Since the camera image transmitted from the camera unit 2 is under the influence of the lens distortion when imaged by the camera, correction can be made to the camera image free from the influence of the lens distortion by calculating the lens distortion inverse function $i^{-1}( )$.

The projection inverse function calculation block 162 finds an inverse function $h^{-1}( )$ of the above-mentioned projection function h( ) based on the projection information included in the information for generating images, and calculates with respect to the camera image free from the influence of lens distortion outputted from the lens distortion inverse function calculation block 161. Since the camera image transmitted from the camera unit 2 is subjected to the distortion by the projection system of the lens when imaged by the camera, correction can be made to the camera image free from the projection distortion by calculating the projection inverse function $h^{-1}( )$.

The viewpoint transformation function calculation block 163 applies the above-mentioned viewpoint transformation function j( ) based on the viewpoint information included in the information for generating images with respect to the camera image free from the projection distortion outputted from the projection inverse function calculation block 162.

Thus, the camera image in which the viewpoint transformation is performed can be acquired.

In FIG. 1, the image superimposing section 17 superimposes the guide line image and the correction camera image as images of different layers so that the guide line image calculated and drawn by the line drawing section 14 is overlaid on the correction camera image outputted from the camera image correction section 16. The display section 18 applies the projected image output function g( ) with respect to the correction camera image in the guide line image and the correction camera image of different layers; and accordingly, the size of the correction camera image is changed to the size capable of being displayed by the display section 18. Then, the guide line image and the correction camera image whose size is changed are synthesized to be displayed. The projected image output function g( ) may be executed by the camera image correction section 16. The projected image output function g( ) may be executed with respect to the guide line image by the display section 18, not by the guide line calculation section 13.

Next, operation will be described. The operation of the guide line calculation section 13 differs from that of the camera image correction section 16 according to the display condition information outputted from the display condition determination section 12. For example, the following four display conditions are conceivable as the display condition information by the difference in operation of the camera image correction section 16, that is, by the difference in displaying method of the camera image. Incidentally, even in the case of any display condition, the guide line image is drawn so as to match with the camera image.

(1) In a first display condition, the camera image correction section 16 does not correct the camera image. The guide line calculation section 13 calculates the guide line information to which the lens distortion and the distortion by the projection system are added and the projection plane transformation is applied. The lens of the camera of the camera unit 2 is so-called the fisheye lens having an angle of view of equal to or more than 180 degrees; and therefore, the camera image displays a wide range including the periphery of an installation location of the camera, easily grasps circumstances surrounding the vehicle, and suits to confirm whether or not there is a pedestrian around the vehicle at the time of starting the vehicle.

Although the image displayed in the first display condition has the distortion, the image is an image that can see a wide range; and therefore, the image displayed in the first display condition is referred to as a wide-angle image.

(2) In a second display condition, the camera image correction section 16 corrects the camera image so as to eliminate the lens distortion and the distortion by the projection system. The guide line calculation section 13 calculates the guide line information to which only the projection plane transformation is applied. An image in a rectangular coordinate system, which is susceptible to grasping a sense of distance, is made; and therefore, the image is an image suitable for during backward movement, which is important to grasp the sense of distance. Incidentally, the angle of view to such an extent that maintains linearity is limited and therefore a visual field becomes narrower as compared to the first display condition. The image displayed in the second display condition, which is the image in which the distortion due to the lens shape and the distortion by the projection system are eliminated, is referred to as a no-distortion image.

(3) In a third display condition, the camera image correction section 16 eliminates the lens distortion and the distortion by the projection system and corrects the camera image as performed by the viewpoint transformation. The guide line calculation section 13 calculates the guide line information to which the projection plane transformation and the viewpoint transformation are applied. A viewpoint after performing the viewpoint transformation is located at, for example, a predetermined position where the rear end center of the vehicle is positioned at the end of the image and a predetermined height (for example, 5 m), and the viewpoint faces straight down. The camera image performed by the viewpoint transformation to this viewpoint becomes an image in which the road surface behind the vehicle is seen from directly overhead, and becomes an image in which the angle between directions parallel or perpendicular to the vehicle is seen as a right angle and a sense of distance near an actual distance in a horizontal direction and a vertical direction can be grasped; and therefore, the positional relationship of the vehicle on the road surface is easily grasped. The image displayed in the third display condition is referred to as a different viewpoint no-distortion image.

(4) In a fourth display condition, the camera image correction section 16 corrects the camera image as performed by the viewpoint transformation. The guide line calculation section 13 calculates the guide line information to which the lens distortion and the distortion by the projection system are added and the projection plane transformation and the viewpoint transformation are applied. The viewpoint after performing the viewpoint transformation is the same as the case of the third display condition. The camera image performed by the viewpoint transformation to this viewpoint becomes an image in which the road surface behind the vehicle is seen from directly overhead, and a wide range surrounding the vehicle can be seen although the distortion is present. The image displayed in the fourth display condition is referred to as a different viewpoint wide-angle image. Furthermore, the image displayed in the third display condition or the fourth display condition is referred to as a different viewpoint image.

Figure 5:
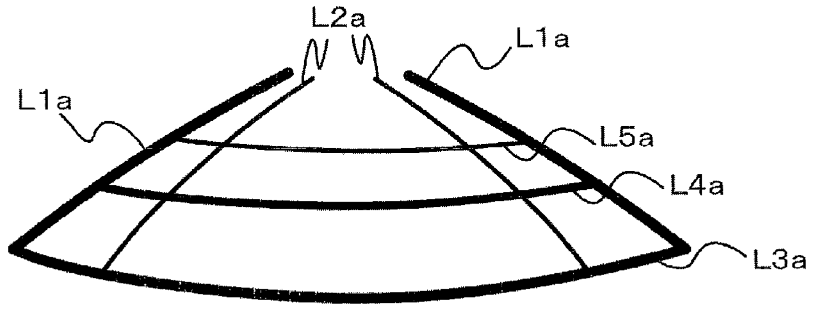
FIG. 5 is an example of a guide line image to be displayed in a first display condition in the driving assist system according to Embodiment 1.

When the display condition information is the first display condition, constitutional elements other than the viewpoint transformation function calculation block 135 in the configuration of the guide line calculation section 13 shown in FIG. 2 are made to operate. That is, calculated results by the lens distortion function calculation block 132, the projection function calculation block 133, and the projection plane transformation function calculation block 134 are inputted to the projected image output function calculation block 136. As a result, guide line image generated by the line drawing section 14 becomes as shown in FIG. 5. FIG. 5 is an example of the guide line image generated in the first display condition. So as to match with a camera image having the lens distortion and the distortion by the projection system, a guide line image to which similar distortion is added is generated. In FIG. 5, lines L1*a* are guide lines showing the width of the parking partition and correspond to the straight lines L1 in FIG. 3. Lines L2*a* are guide lines showing the width of the vehicle and correspond to the straight lines L2 in FIG. 3. Lines L3*a* to L5*a* are guide lines showing the distance from the vehicle and correspond to the straight lines L3 to L5 in FIG. 3. Furthermore, all of the constitutional elements of the camera image correction section 16 shown in FIG. 4 are made not to operate. That is, the camera image correction section 16 outputs inputted camera images directly to the image superimposing section 17.

Figure 6:
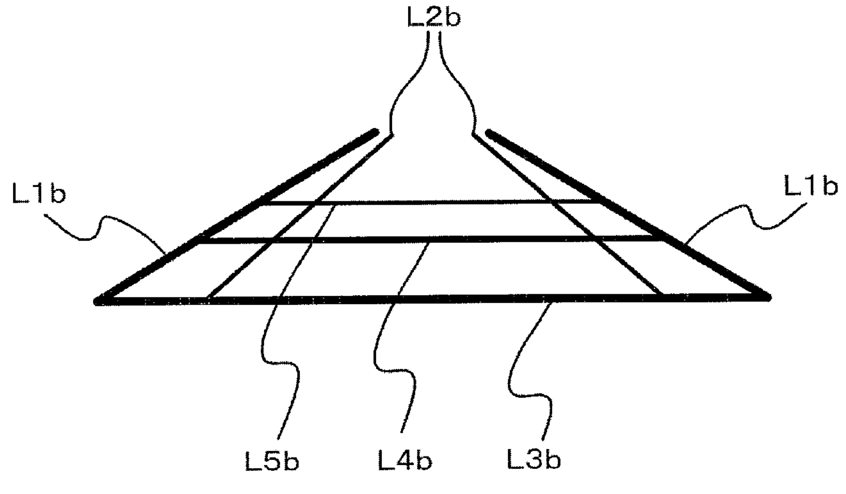
FIG. 6 is an example of a guide line image to be displayed in a second display condition in the driving assist system according to Embodiment 1.

When the display condition information is the second display condition, the lens distortion function calculation block 132, the projection function calculation block 133, and the viewpoint transformation function calculation block 135 in the configuration of the guide line calculation section 13 shown in FIG. 2 are made not to operate. That is, the coordinates P outputted from the guide line generation block 131 are directly inputted to the projection plane transformation function calculation block 134. As a result, a guide line image generated by the line drawing section 14 becomes as shown in FIG. 6. FIG. 6 is an example of the guide line image generated under the second display condition. The guide line image with no distortion is generated so as to match with the camera image in which the lens distortion and the distortion by the projection system are eliminated. In FIG. 6, straight lines L1*b* are guide lines showing the width of the parking partition and correspond to the straight lines L1 in FIG. 3. Straight lines L2*b* are guide lines showing the width of the vehicle and correspond to the straight line L2 in FIG. 3. Straight lines L3*b* to L5*b* are guide lines showing the distance from the vehicle and correspond to the straight lines L3 to L5 in FIG. 3. Furthermore, constitutional elements other than the viewpoint transformation function calculation block 163 in the configuration of the camera image correction section 16 shown in FIG. 4 are made to operate. That is, camera images outputted from the projection inverse function calculation block 162 are inputted to the image superimposing section 17 as the correction camera image.

Figure 7:
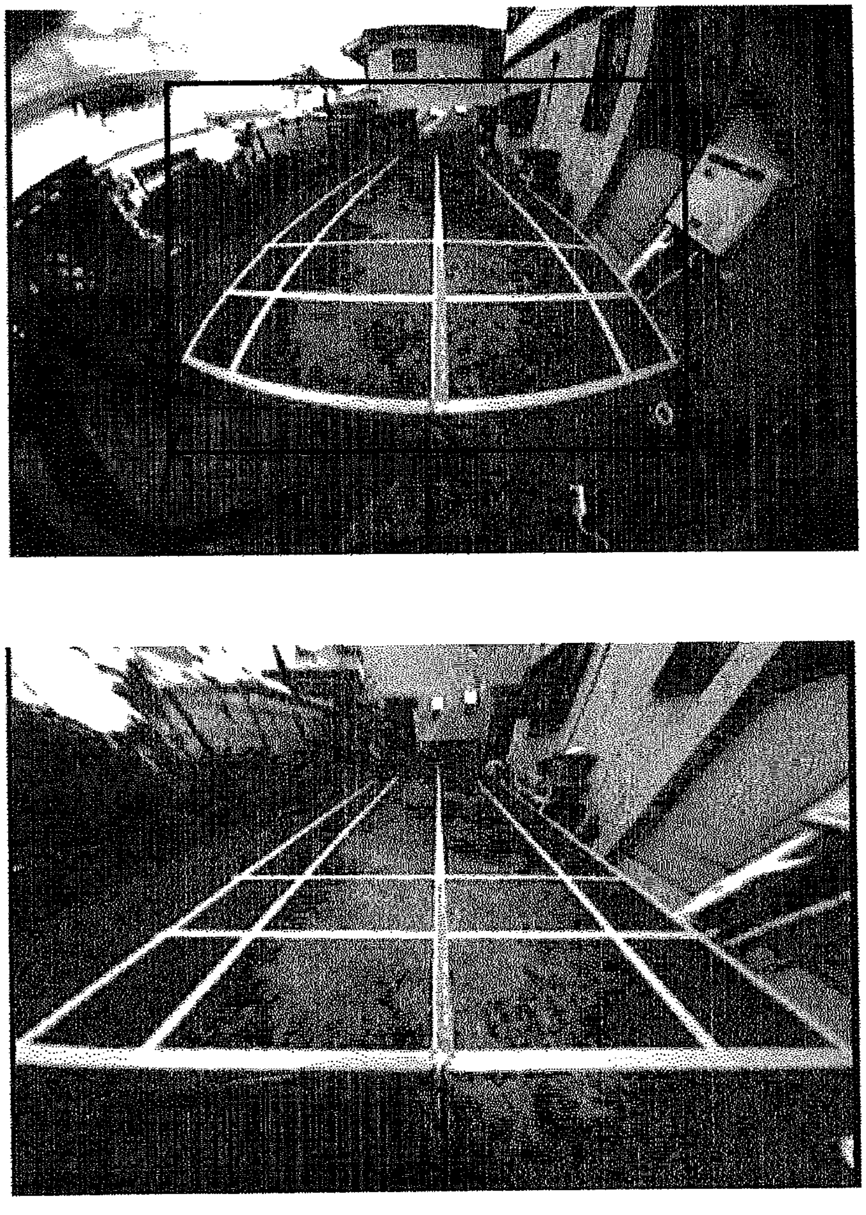
FIG. 7 is photographs of images to be displayed on a display device, which explain by examples the relationship between a wide-angle image to be displayed in the first display condition and a no-distortion image to be displayed in the second display condition in the driving assist system according to Embodiment 1.

Photographs of images to be displayed on the display device, which explain by examples the relationship between the wide-angle image displayed in the first display condition and the no-distortion image displayed in the second display condition, are shown in FIG. 7. The upper side of FIG. 7 is the wide-angle image displayed in the first display condition and a wide range is displayed, although a peripheral portion of the image is distorted. The lower side thereof is the no-distortion image displayed in the second display condition. In the no-distortion image, a portion surrounded with a black rectangle at a central portion of the wide-angle image is displayed in a state with no distortion.

Advantages of using the fisheye lens will be described. When the distortion is eliminated from the image, the angle of view to such an extent that maintains linearity is limited according to the projection system. Furthermore, the wider the angle of view becomes and the closer to the end of the image comes, the larger a sense of discomfort becomes. For example, in the case of using a normal lens, if a focal distance of the lens is f, an incident angle of incident light, that is, a half angle of view is θ, and an image height in an imaging area of the camera is Y, a relationship of $Y=f*\tan\theta$ is satisfied. The image height Y is a tangent function (tan θ); and therefore, a range in which the tangent function can be approximated in a straight line, that is, the incident light of the incident angle of a range of approximately θ=−45 to +45 degrees reaches the imaging area with a small distortion. However, since the incident light of the incident angle other than that range is largely distorted, such incident light cannot reach the imaging area; alternatively, even if capable of reaching, an image with a large distortion is formed. In this respect, the camera unit 2 according to the present embodiment uses the fisheye lens; and therefore, imaging can be performed with a small distortion at an angle of view wider than that of the normal lens. For example, in the stereographic projection that is one of the projection systems of the fisheye lens, a relationship of $Y=2*f*\tan(\theta/2)$ is satisfied; however, the tangent function is a function of θ/2 and therefore Y changes in almost proportion to θ in a range of approximately θ=−90 to +90 degrees. In other words, correction can be made to an image with substantially no distortion at an angle of view of approximately 180 degrees.

When the display condition information is the third display condition, constitutional elements other than the lens distortion function calculation block 132 and the projection function calculation block 133 in the configuration of the guide line calculation section 13 shown in FIG. 2 are made to operate. That is, the coordinates P of the points on the guide lines generated by the guide line generation block 131 are directly inputted to the viewpoint transformation function calculation block 135. As a result, a guide line image generated by the line drawing section 14 is as shown in FIG. 3. Furthermore, all of the constitutional elements of the camera image correction section 16 shown in FIG. 4 are made to operate. A display is made by superimposing a guide line image with no distortion as seen from a different viewpoint on a camera image as imaged from a different viewpoint by eliminating the lens distortion and the distortion by the projection system.

Figure 8:
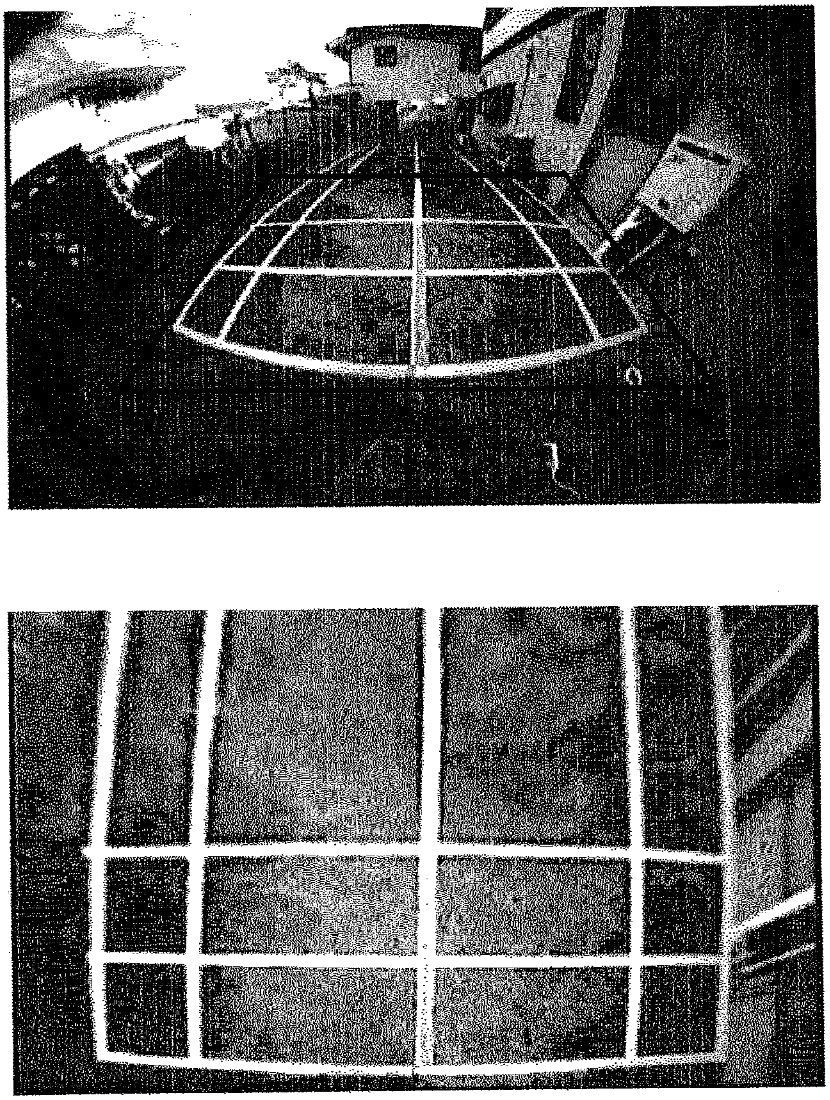
FIG. 8 is photographs of images to be displayed on the display device, which explains by examples the relationship between the wide-angle image displayed in the first display condition and a different viewpoint no-distortion image to be displayed in a third display condition in the driving assist system according to Embodiment 1.

Photographs of images to be displayed on the display device, which explain by examples the relationship between the wide-angle image displayed in the first display condition and the different viewpoint no-distortion image displayed in the third display condition, are shown in FIG. 8. The lower side of FIG. 8 is the no-distortion image displayed in the third display condition. In the different viewpoint no-distortion image, a portion surrounded with a black rectangle at a central portion of the wide-angle image is displayed as an image with no distortion seen from a viewpoint above behind the vehicle.

Figure 9:
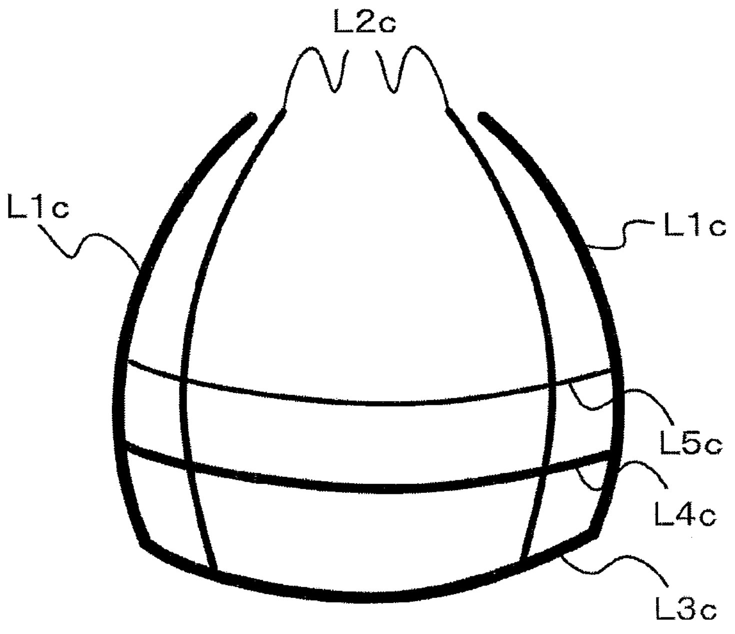
FIG. 9 is an example of a guide line image to be displayed in a fourth display condition in the driving assist system according to Embodiment 1.

When the display condition information is the fourth display condition, all of the constitutional elements of the guide line calculation section 13 shown in FIG. 2 are made to operate. As a result, a guide line image generated by the line drawing section 14 is as shown in FIG. 9. FIG. 9 is an example of the guide line image generated in the fourth display condition. So as to match with a camera image having the lens distortion and the distortion by the projection system, the camera image being as imaged from a different viewpoint; a guide line image to which a similar distortion is added is generated, the guide line image being as seen from a different viewpoint. In FIG. 9, lines L1*c* are guide lines showing the width of the parking partition and correspond to the straight lines L1 in FIG. 3. Lines L2*c* are guide lines showing the width of the vehicle and correspond to the straight lines L2 in FIG. 3. Lines L3*c* to L5*c* are guide lines showing the distance from the vehicle and correspond to the straight lines L3 to L5 in FIG. 3. Furthermore, only the viewpoint transformation function calculation block 163 in the configuration of the camera image correction section 16 shown in FIG. 4 is made to operate. That is, a camera image received by the camera image receiving section 15 is directly inputted to the viewpoint transformation function calculation block 163, and an image to which the viewpoint transformation is performed by the viewpoint transformation function calculation block 163 is outputted to the image superimposing section 17 as a correction camera image.

Figure 10:
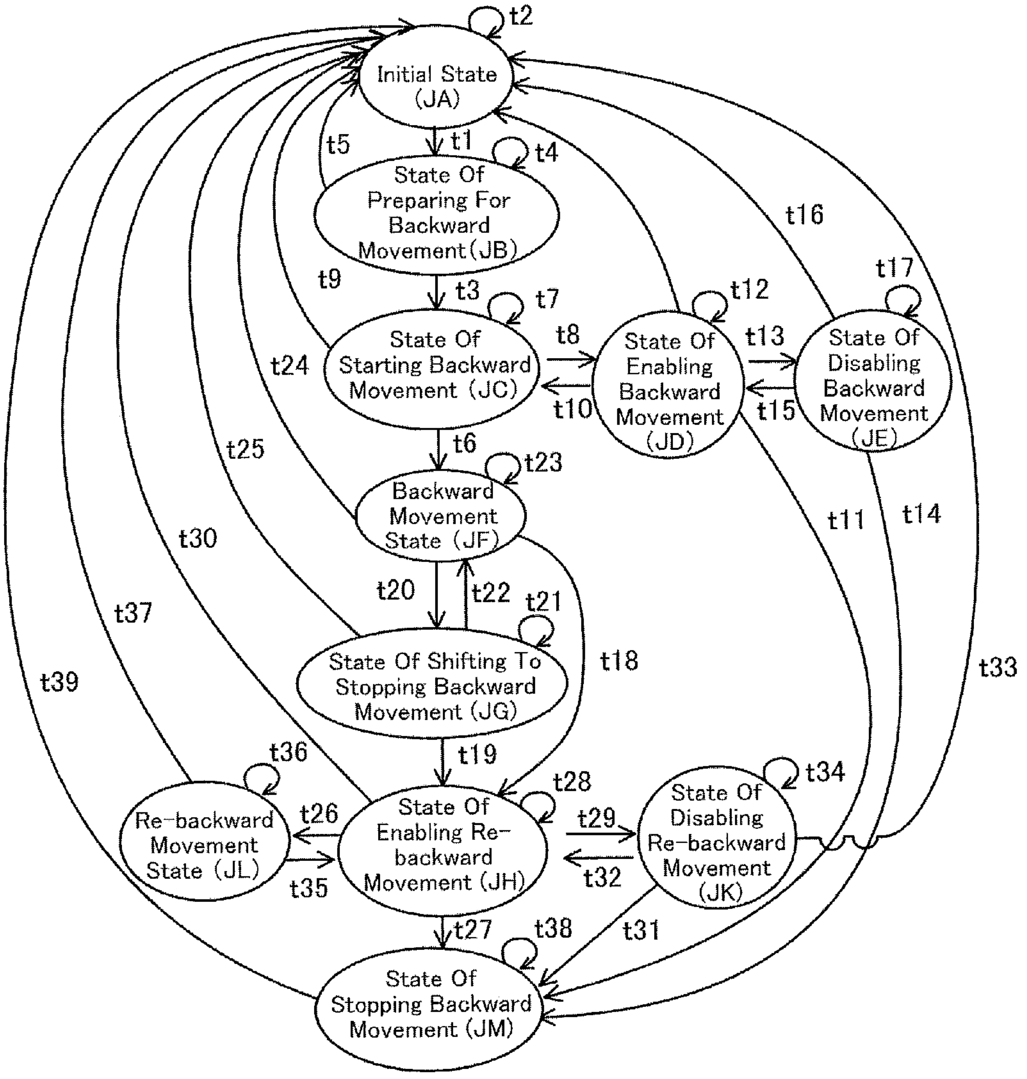
FIG. 10 is a diagram for explaining changes in vehicle state recognized by a display condition determination section of the driving assist system according to Embodiment 1.

Description will be made how the display condition determination section 12 operates and recognizes the vehicle state when the vehicle is made to move backward and park. FIG. 10 is a diagram for explaining changes in vehicle state recognized by the display condition determination section 12.

The vehicle state recognized by the display condition determination section 12 includes the following states. Incidentally, the speed of the vehicle is regarded as positive when the vehicle moves in a backward direction.

Initial state (JA): A state other than the below mention. When an engine of the vehicle starts, the vehicle state becomes an initial state, which is not a state to be assisted by the driving assist apparatus. After becoming any of the following states, when the gear state is not reverse (backward movement) in a non-stopped state and a speed V is equal to or more than a predetermined speed (Vr1), the vehicle state returns to the initial state (JA). When the speed V is equal to or more than the predetermined speed (Vr1), it is conceivable that a driver thinks unnecessary to watch a moving direction carefully; and therefore, the vehicle state is returned to the initial state (JA).

Although the below mention is not all of the condition that is the initial state (JA), it can be judged as the initial state (JA) when the below-mentioned condition is satisfied. The below-mentioned condition $C_{JA}$ is referred to as a condition that is a clearly initial state condition.

$C_{JA}$=(speed V is negative), or
(speed V is equal to or more than predetermined speed (Vr1)), or
(speed V is not zero and gear state is other than reverse).

State of preparing for backward movement (JB): A state of preparing for backward movement. A condition $C_{JB}$ for a state of preparing for backward movement (JB) is as follows.

$C_{JB}$=(gear state is reverse), and
(movement distance L is zero), and
(speed V is zero).

State of starting backward movement (JC): A state until the vehicle moves a predetermined distance (L1) from starting backward movement. When the speed V is positive in the state of preparing for backward movement (JB), the vehicle state becomes a state of starting backward movement.

$C_{JC}$=(gear state is reverse), and
(movement distance L is positive and less than predetermined distance (L1)), and
(speed V is positive and less than predetermined speed (Vr1)).

State of enabling backward movement (JD): A state until the vehicle moves a predetermined distance (L1) from starting backward movement and where the vehicle stops.

$C_{JD}$=(gear state is reverse), and
(movement distance L is positive and less than predetermined distance (L1)), and
(speed V is zero), and
(parking brake is OFF (ineffective)).

Incidentally, if a parking brake is ON (effective) in a state of enabling backward movement (JD), the vehicle state is a state of stopping backward movement (JM) to be described later.

State of disabling backward movement (JE): A state where the transmission is other than reverse in the state of enabling backward movement (JD) and a predetermined time (Tn1) does not elapse. If the predetermined time (Tn1) elapses, the vehicle state is the initial state (JA).

$C_{JD}$=(movement distance L is positive and less than predetermined distance (L1)), and
(speed V is zero), and
(gear state is other than reverse), and
(duration time (Tn) other than reverse is less than predetermined time (Tn1)), and
(parking brake is OFF).

Incidentally, if the parking brake is ON in the state of disabling backward movement (JE), the vehicle state is the state of stopping backward movement (JM) to be described later. If the gear state is reverse, the vehicle state is the state of enabling backward movement (JD).

When the vehicle is made to park, the vehicle state is treated as the state of disabling backward movement (JE) until the predetermined time (Tn1) so as to be able to change to the state of stopping backward movement (JM) even when the gear state is changed before the parking brake is ON after stopping the vehicle.

Backward movement state (JF): A state where backward movement continues even when moving equal to or more than the predetermined distance (L1) from starting the backward movement and a condition of deceleration which is a condition of detecting shifting to stopping is not established. When the condition of deceleration is established, the vehicle state is a next state of shifting to stopping backward movement (JG). The condition of deceleration is that deceleration, more specifically, acceleration a being negative continues for a predetermined time (Ta1). The reason to provide a condition of duration time for the deceleration is to prevent the backward movement state (JF) and the state of shifting to stopping backward movement (JG) from frequently switching at a short interval when fluctuation between negative and equal to or more than zero in acceleration a is frequently generated.

$C_{JF}$=(gear state is reverse), and
(movement distance L is equal to or more than predetermined distance (L1)), and
(speed V is positive and less than predetermined speed (Vr1)), and
(condition of deceleration $C_{gn}$ is not established).

$C_{gn}$=(acceleration a is negative), and
(duration time (Ta) at which acceleration a is negative is equal to or more than predetermined time (Ta1)).

State of shifting to stopping backward movement (JG): A state where backward movement continues with the condition of deceleration established after becoming the backward movement state (JF).

$C_{JG}$=(gear state is reverse), and
(movement distance L is equal to or more than predetermined distance (L1)), and
(speed V is positive and less than predetermined speed (Vr1)), and
(condition of deceleration $C_{gn}$ is established.

State of enabling re-backward movement (JH): A state where the vehicle stops in a state enabling backward movement after becoming the state of shifting to stopping backward movement (JG).

$C_{JH}$=(gear state is reverse), and
(parking brake is OFF), and
(movement distance L is equal to or more than predetermined distance (L1)), and
(speed V is zero).

State of disabling re-backward movement (JK): A state where the transmission is other than reverse in the state of enabling re-backward movement (JH) and the predetermined time (Tn1) does not elapse. If the predetermined time (Tn1) elapses, the vehicle state is the initial state (JA).

$C_{JD}$=(movement distance L is equal to or more than predetermined distance (L1)), and
(speed V is zero), and
(gear state is other than reverse), and
(duration time (Tn) other than reverse is less than predetermined time (Tn1)), and (parking brake is OFF).

Incidentally, if the parking brake is ON in the state of disabling backward movement (JE), the vehicle state is a state of stopping backward movement (JM) to be described later. If the gear state is reverse, the vehicle state is the state of enabling re-backward movement (JH).

Re-backward movement state (JL): A state where the vehicle moves backward just after the state of enabling re-backward movement (JH).

$C_{JL}$=(gear state is reverse), and (speed V is positive and less than predetermined speed (Vr1)), and (movement distance L is equal to or more than predetermined distance (L1)).

State of stopping backward movement (JM): A state where the vehicle stops in a state of not enabling backward movement after becoming a state that is not the state of preparing for backward movement (JB).

$C_{JM}$=(speed V is zero), and (parking brake is ON).

With respect to such vehicle states, the display condition determination section 12 determines display conditions as follows.

(1) In the state of preparing for backward movement (JB), the state of starting backward movement (JC), the state of enabling backward movement (JD), and the state of disabling backward movement (JE), the display condition is the first display condition. The camera image is an image directly imaged by the camera and has the lens distortion and the distortion by the projection system. The lens of the camera of the camera unit 2 is so-called the fisheye lens having an angle of view of equal to or more than 180 degrees; and therefore, the camera image displays a wide range including the periphery of an installation location of the camera, easily grasps circumstances surrounding the vehicle, and suits to confirm whether or not there is a pedestrian around the vehicle at the time of starting the vehicle. Since the guide line image is also displayed so as to match with the camera image, a distance with the parking partition is easily grasped.

In this case, the state of preparing for backward movement (JB), the state of enabling backward movement (JD), and the state of disabling backward movement (JE) are a state of preparing for movement which is a state where the vehicle is movable and stops. In this embodiment, a predetermined condition during movement which judges that the vehicle is a state during movement is regarded as that the vehicle moves the predetermined distance (L1). The state of starting backward movement (JC) which is the state until the vehicle moves the predetermined distance (L1) and where the vehicle moves backward is a state of starting movement.

(2) In the backward movement state (JF), the display condition is the second display condition. The camera image in which the lens distortion and the distortion by the projection system are eliminated and the guide line image matched therewith are displayed. An image in a rectangular coordinate system, which is susceptible to grasping a sense of distance, is made; and therefore, the image is an image suitable for during backward movement, which is important to grasp the sense of distance.

The backward movement state (JF) in which the vehicle moves backward after moving the predetermined distance (L1) is the state during movement, which is the state where the vehicle moves after the condition during movement is established.

(3) In the state of shifting to stopping backward movement (JG), the state of enabling re-backward movement (JH), the state of stopping backward movement (JM), and the state of disabling re-backward movement (JK), the display condition is the third display condition. The camera image performed by the viewpoint transformation becomes an image in which the road surface behind the vehicle is seen from directly overhead, and becomes an image in which the angle between directions parallel or perpendicular to the vehicle is seen as a right angle and a sense of distance near an actual distance in a horizontal direction and a vertical direction is grasped; and therefore, the positional relationship of the vehicle on the road surface is easily grasped.

The state of shifting to stopping backward movement (JG) is a state of shifting to stopping which is a state that detects that a predetermined condition of detecting shifting to stopping (in this embodiment, the condition of deceleration $C_{gn}$), which detects that the vehicle starts to stop, is established. The state of enabling re-backward movement (JH), the state of stopping backward movement (JM), and the state of disabling re-backward movement (JK) are a stop state that is a state where the vehicle stops after the state of shifting to stopping.

(4) In the re-backward movement state (JL), a display is made in the first display condition so as to display the wide range behind the vehicle during a period of time of confirming circumstances of a movement direction of approximately several seconds after changing to the state. After that, a display is made in the third display condition similar to the state of shifting to stopping.

The re-backward movement state (JL) is a re-movement state that is a state where the vehicle moves after the stop state.

The initial state (JA) is not a state to be assisted by the driving assist apparatus of the present invention; and therefore, a screen of the navigation device is displayed on the display device. When returned to the initial state (JA) after becoming the state of preparing for backward movement (JB), a screen displayed before becoming the state of preparing for backward movement (JB) or a screen determined by the state at the time when returned to the initial state (JA) is displayed. Incidentally, a screen in a state just before changing to the initial state (JA) may be displayed until a phenomenon which changes the display of the screen is generated.

Figure 11:
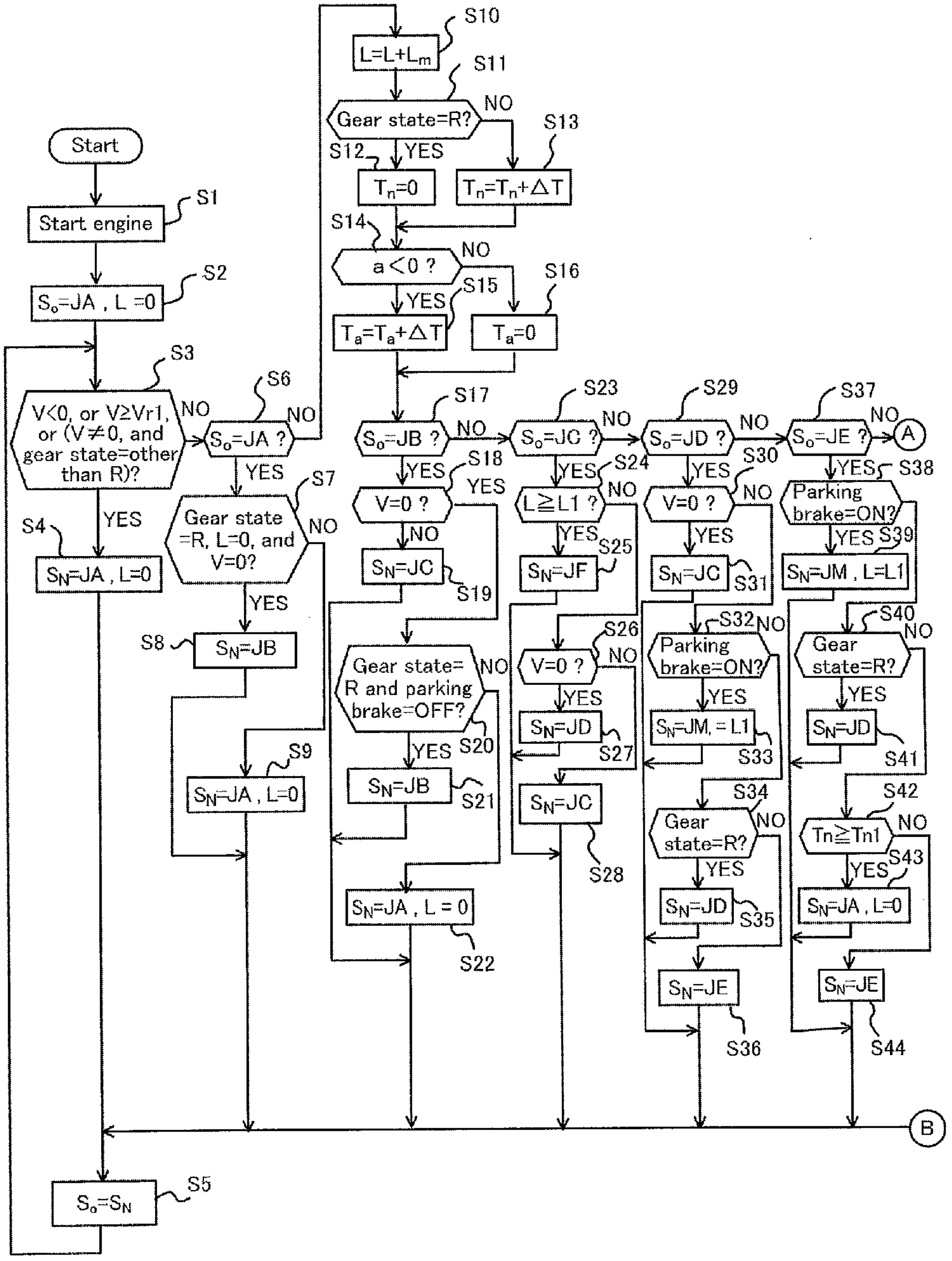
FIG. 11 is a flow chart for explaining operation which judges vehicle states in the display condition determination section of the driving assist system according to Embodiment 1.
Figure 12:
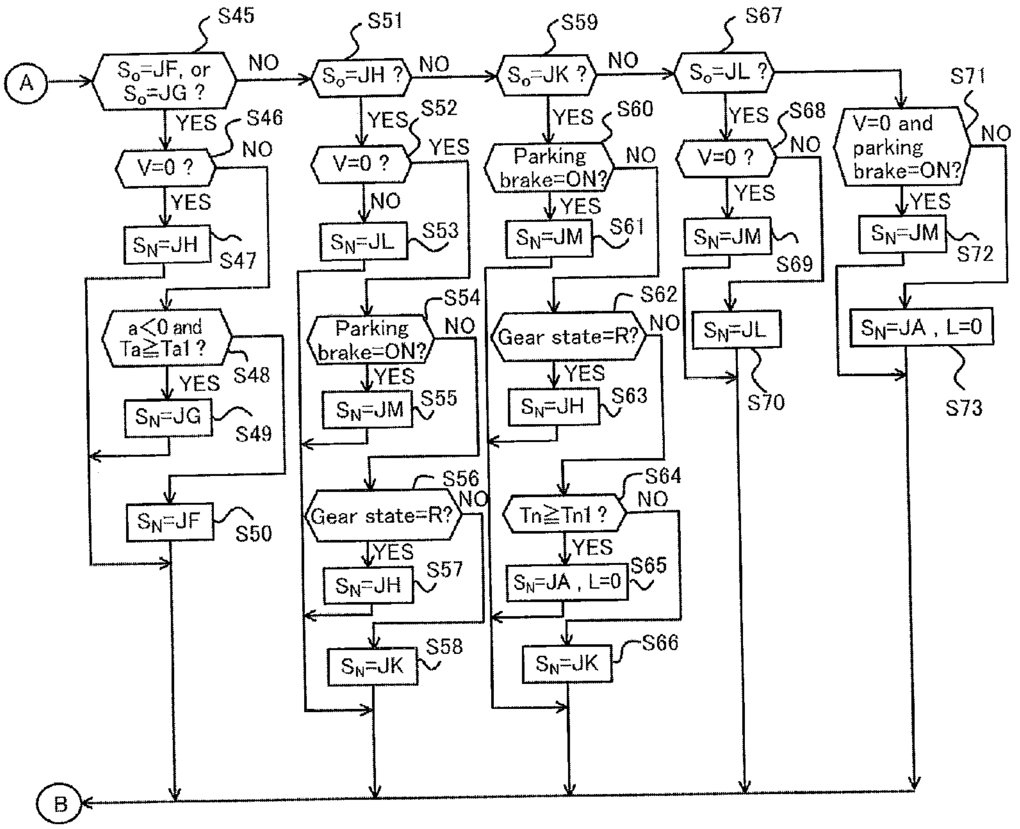
FIG. 12 is a flow chart for explaining operation which judges vehicle states in the display condition determination section of the driving assist system according to Embodiment 1.

FIG. 11 and FIG. 12 are each a flow chart for explaining operation which judges vehicle states in the display condition determination section 12. Description will be made below with reference to FIG. 11 and FIG. 12, including relationship to the drawing for explaining the changes in state of FIG. 10.

When the engine of the vehicle starts in S1, the display condition determination section 12 sets a vehicle state (hereinafter, expressed as $S_O$) to the initial state (JA) and a movement distance L is set to L=0 in S2. Thereafter, processing after S3 is repeatedly executed at a cycle (ΔT) in which the vehicle information is inputted from the ECU and a new vehicle state (hereinafter, expressed as $S_N$) is determined. In S3, a check is made whether or not the condition $C_{JA}$ that is clearly the initial state is established. Incidentally, in FIG. 11 and FIG. 12, reverse (backward movement) is expressed as R. When $C_{JA}$ is established, $S_N$ is set to the initial state (JA) in S4 and the movement distance L is set to L=0 (all arrows entering to the initial state (JA) of FIG. 10). Before returning to S3, the vehicle state is set to $S_O=S_N$ in S5.

When $C_{JA}$ is not established in S4, a check is made whether or not $S_O$ is the initial state (JA) in S6. Incidentally, when $C_{JA}$ is not established, the speed V is equal to or more than zero and less than the predetermined speed (Vr1); and when the speed V is not zero, the gear state is reverse.

(1) Processing in the Initial State (JA)

When $S_O$ is the initial state (JA) in S6, a check is made whether or not the condition $C_{JB}$ is established in S7. When $C_{JB}$ is established, $S_N$ is set to the state of preparing for backward movement (JB) in S8 (an arrow t1 of FIG. 10). When $C_{JB}$ is not established, $S_N$ is set to the initial state (JA) in S9 (an arrow t2 of FIG. 10).

When $S_O$ is not the initial state (JA) in S6, necessary information is calculated for judging the vehicle state in S10 to S16. A movement distance Lm from the previous processing point, which is acquired from the vehicle information, is added to the movement distance L (L=L+Lm) in S10. A check is made whether or not the gear state is R in S11. When the gear state is not R (reverse), duration time (Tn) at which the gear state is other than R is set to zero (Tn=0) in S12. When the gear state is R, a time of one cycle (ΔT) is added to the duration time (Tn) (Tn=Tn+ΔT) in S13. Further, a check is made whether or not the acceleration a is negative (a<0) in S14. When the acceleration a is negative, the time of one cycle (ΔT) is added to the duration time (Ta) at which the acceleration a is negative (Ta=Ta+ΔT) in S15. When the acceleration a is not negative, the duration time (Ta) at which the acceleration a is negative is set to zero (Ta=0) in S16.

A check is made whether or not $S_O$ is the state of preparing for backward movement (JB) in S17.

(2) Processing in the State of Preparing for Backward Movement (JB)

When $S_O$ is the state of preparing for backward movement (JB) in S17, a check is made whether or not the speed V is zero in S18. When the speed V is not zero, $S_N$ is set to the state of starting backward movement (JC) in S19 (an arrow t3 of FIG. 10). When the speed V is zero, a check is made whether or not the gear state is R and the parking brake is OFF in S20. When the gear state is R and the parking brake is OFF, $S_N$ is set to the state of preparing for backward movement (JB) in S21 (an arrow t4 of FIG. 10). If this is not the case, $S_N$ is set to the initial state (JA) and the movement distance L is set to L=0 in S22 (an arrow t5 of FIG. 10).

When $S_O$ is not the state of preparing for backward movement (JB) in S17, a check is made whether or not $S_O$ is the state of starting backward movement (JC) in S23.

(3) Processing in the State of Starting Backward Movement (JC)

When $S_O$ is the state of starting backward movement (JC) in S23, a check is made whether or not the movement distance L is equal to or more than the predetermined distance L1 (L≥L1) in S24. When L≥L1 is established, $S_N$ is set to the backward movement state (JF) in S25 (an arrow t6 of FIG. 10). When L<L1 is established, a check is made whether or not the speed V is zero (V=0) in S26. When the speed V is not zero, $S_N$ is set to the state of starting backward movement (JC) in S27 (an arrow t7 of FIG. 10). When the speed V is zero, $S_N$ is set to the state of enabling backward movement (JD) in S28 (an arrow t8 of FIG. 10).

When $S_O$ is not the state of starting backward movement (JC) in S23, a check is made whether or not $S_O$ is the state of enabling backward movement (JD) in S29.

(4) Processing in the state of enabling backward movement (JD)

When $S_O$ is the state of enabling backward movement (JD) in S29, a check is made whether or not the speed V is zero (V=0) in S30. When the speed V is zero, $S_N$ is set to the state of starting backward movement (JC) in S31 (an arrow t10 of FIG. 10). When the speed V is not zero, a check is made whether or not the parking brake is ON in S32. When the parking brake is ON, the movement distance L is set to Ll (L=L1) and $S_N$ is set to the state of stopping backward movement (JM) in S33 (an arrow t11 of FIG. 10). When the parking brake is OFF, a check is made whether or not the gear state is R in S34. When the gear state is R, $S_N$ is set to the state of enabling backward movement (JD) in S35 (an arrow t12 of FIG. 10). When the gear state is other than R, $S_N$ is set to the state of disabling backward movement (JE) in S36 (an arrow t13 of FIG. 10).

When $S_O$ is not the state of enabling backward movement (JD) in S29, a check is made whether or not $S_O$ is the state of disabling backward movement (JE) in S37.

(5) Processing in the State of Disabling Backward Movement (JE)

When $S_O$ is the state of disabling backward movement (JE) in S37, a check is made whether or not the parking brake is ON in S38. When the parking brake is ON, the movement distance L is set to L1 (L=L1) and $S_N$ is set to the state of stopping backward movement (JM) in S39 (an arrow t14 of FIG. 10). When the parking brake is OFF, a check is made whether or not the gear state is R in S40. When the gear state is R, $S_N$ is set to the state of enabling backward movement (JD) in S41 (an arrow t15 of FIG. 10). When the gear state is other than R, a check is made whether or not the duration time (Tn) at which the gear state is other than R is equal to or more than the predetermined time (Tn1) in S42. When the duration time (Tn) is equal to or more than the predetermined time (Tn1), $S_N$ is set to the initial state (JA) and the movement distance L is set to L=0 in S43 (an arrow t16 of FIG. 10). When the duration time (Tn) is not equal to or more than the predetermined time (Tn1), $S_N$ is set to the state of disabling backward movement (JE) in S44 (an arrow t17 of FIG. 10).

When $S_O$ is not the state of disabling backward movement (JE) in S37, a check is made whether or not $S_O$ is the backward movement state (JF) or the state of shifting to stopping backward movement (JG) in S45.

(6) Processing in the Backward Movement State (JF) or the State of Shifting to Stopping Backward Movement (JG)

When $S_O$ is the backward movement state (JF) or the state of shifting to stopping backward movement (JG) in S45 shown in FIG. 12, a check is made whether or not the speed V is zero (V=0) in S46. When the speed V is zero, $S_N$ is set to the state of enabling re-backward movement (JH) in S47 (arrows t18, t19 of FIG. 10). When the speed V is not zero, a check is made whether or not the condition of deceleration $C_{gn}$ is established in S48. When $C_{gn}$ is established, $S_N$ is set to the state of shifting to stopping backward movement (JG) in S49 (arrows t20, t21 of FIG. 10). When $C_{gn}$ is not established, $S_N$ is set to the backward movement state (JF) in S50 (arrows t22, t23 of FIG. 10).

When $S_O$ is not the backward movement state (JF) or the state of shifting to stopping backward movement (JG) in S45, a check is made whether or not $S_O$ is the state of enabling re-backward movement (JH) in S51.

(7) Processing in the State of Enabling Re-Backward Movement (JH)

When $S_O$ is the state of enabling re-backward movement (JH) in S51, a check is made whether or not the speed V is zero in S52. When the speed V is not zero, $S_N$ is set to the re-backward movement state (JL) in S53 (an arrow t26 of FIG. 10). When the speed V is zero, a check is made whether or not the parking brake is ON in S54. When the parking brake is ON, $S_N$ is set to the state of stopping backward movement (JM) in S55 (an arrow t27 of FIG. 10). When the parking brake is OFF, a check is made whether or not the gear state is R in S56. When the gear state is R, $S_N$ is set to the state of enabling re-backward movement (JH) in S57 (an arrow t28 of FIG. 10). When the gear state is other than R, $S_N$ is set to the state of disabling re-backward movement (JK) in S58 (an arrow t29 FIG. 10).

When $S_O$ is not the state of enabling re-backward movement (JH) in S51, a check is made whether or not $S_O$ is the state of disabling re-backward movement (JK) in S59.

(8) Processing in the State of Disabling Re-Backward Movement (JK)

When $S_O$ is the state of disabling re-backward movement (JK) in S59, a check is made whether or not the parking brake is ON in S60. When the parking brake is ON, $S_N$ is set to the state of stopping backward movement (JM) in S61 (an arrow t31 of FIG. 10). When the parking brake is OFF, a check is made whether or not the gear state is R in S62. When the gear state is R, $S_N$ is set to the state of enabling re-backward movement (JH) in S63 (an arrow t32 of FIG. 10). When the gear state is other than R, a check is made whether or not the duration time (Tn) in which the gear state is other than R is equal to or more than the predetermined time (Tn1) in S64. When the duration time (Tn) is equal to or more than the predetermined time (Tn1), $S_N$ is set to the initial state (JA) and the movement distance L is set to L=0 in S65 (an arrow t33 of FIG. 10). When the duration time (Tn) is not equal to or more than the predetermined time (Tn1), $S_N$ is set to the state of disabling re-backward movement (JK) in S66 (an arrow t34 of FIG. 10).

When $S_O$ is not the state of disabling re-backward movement (JK) in S59, a check is made whether or not $S_O$ is the re-backward movement state (JL) in S67.

(9) Processing in the re-backward movement state (JL)

When $S_O$ is the re-backward movement state (JL) in S67, a check is made whether or not the speed V is zero in S68. When the speed V is zero, $S_N$ is set to the state of enabling re-backward movement (JH) in S69 (an arrow t35 of FIG. 10). When the speed V is not zero, $S_N$ is set to the re-backward movement state (JL) in S70 (an arrow t36 of FIG. 10).

When $S_O$ is not the state of disabling re-backward movement (JK) in S67, $S_N$ is to be the state of stopping backward movement (JM).

(10) Processing in the state of stopping backward movement (JM)

When $S_O$ is not the state of stopping backward movement (JM), a check is made whether or not $C_{JM}$ is established in S71. When $_{CJM}$ is established, $S_N$ is set to the state of stopping backward movement (JM) in S72 (an arrow t38 of FIG. 10). When $C_{JM}$ is not established, $S_N$ is set to the initial state (JA) and the movement distance L is set to L=0 in S73 (an arrow t39 in FIG. 10).

In this way, from the state of the transmission (gear state), the speed V, the movement distance L, the acceleration a, and the state of the parking brake, a judgment is made as to what state the vehicle is in; that is, a judgment is made as to which state the vehicle is in any of the state of preparing for backward movement (JB), the state of starting backward movement (JC), the state of enabling backward movement (JD), the state of disabling backward movement (JE), the backward movement state (JF), the state of shifting to stopping backward movement (JG), the state of enabling re-backward movement (JH), the state of disabling re-backward movement (JK), the re-backward movement state (JL), the state of stopping backward movement (JM), and the initial state (JA). A camera image suitable for assisting the driver can be displayed according to the judged vehicle state.

More specifically, in the state of preparing for movement, which is a state where the vehicle is movable and stops, that is, the state of preparing for backward movement (JB), the state of enabling backward movement (JD), and the state of disabling backward movement (JE); and in the state of starting movement, which is a state where the vehicle until a predetermined condition during movement is established from starting movement moves, that is, the state of starting backward movement (JC), a wide-angle image that is a camera image of a wide range although there is distortion due to the fisheye lens is displayed; and therefore, surrounding circumstances is easily confirmed at the time of starting movement.

In the state during movement, which is the state where the vehicle moves after the condition during movement is established, that is, the backward movement state (JF), a no-distortion image that is an image in which the lens distortion and the distortion by the projection system are eliminated is displayed; and therefore, a sense of distance is easily grasped and backward movement can be easily performed to an appropriate position.

In the state of shifting to stopping, which is the state for detecting that the predetermined condition of detecting shifting to stopping which detects that a moving vehicle starts to stop is established, that is, the state of shifting to stopping backward movement (JG); the stop state that is the state where the vehicle stops after the state of shifting to stopping, that is, the state of enabling re-backward movement (JH); the state of disabling re-backward movement (JK); and the state of stopping backward movement (JM), the different viewpoint no-distortion image, which is an image in which the lens distortion and the distortion by the projection system are eliminated and which is seen from a different viewpoint above behind the vehicle, is displayed. Therefore, the positional relationship of the vehicle on the road surface is easily grasped.

In the re-movement state that is the state where the vehicle moves after the stop state, that is, the re-backward movement state (JL), a wide-angle image that is a camera image of a wide range although there is distortion due to the fisheye lens is displayed for a predetermined period Of time Of confirming circumstances Of a movement direction after becoming the re-movement state; and therefore, surrounding circumstances is easily confirmed at the time of starting movement. After the period of time of confirming circumstances of the movement direction elapses, the different viewpoint no-distortion image is displayed; and therefore, the positional relationship of the vehicle on the road surface is easily grasped.

In this case, the description has been made on the case where the vehicle state changes until the state of stopping backward movement (JM); however, even in the case where the vehicle state changes to the initial state (JA) before becoming the state of shifting to stopping backward movement (JG), the camera image of the wide range (with distortion) due to the fisheye lens is displayed at the time of starting backward movement; and therefore, surrounding circumstances is easily confirmed at the time of starting backward movement. When the vehicle state changes from the backward movement state (JF) to the initial state (JA), an image in which distortion is eliminated and the sense of distance is easily grasped is displayed during backward movement; and therefore, backward movement can be easily performed to an appropriate position.

In this case, a display is made by overlapping the guide line image on the camera image; however, the above-mentioned effect can be obtained by only displaying the camera image to be changed according to the vehicle state. By also displaying the guide line image, the position after the movement of the vehicle is easily grasped and, more particularly, it is effective when stopping for parking.

The case where the movement distance from starting movement is equal to or more than the predetermined distance is regarded as the predetermined condition during movement; however, other condition may be used, for example, time from starting movement is equal to or more than a predetermined time, the speed of the vehicle is equal to or more than a predetermined speed, and the like. The case where deceleration continues for a predetermined time is regarded as the predetermined condition of detecting shifting to stopping which detects that a moving vehicle starts to stop; however, other condition may be used, for example, the speed of the vehicle is equal to or less than a predetermined speed, the speed of the vehicle is equal to or less than a predetermined speed after moving a predetermined distance from starting movement, and the like. A condition, which judges that the vehicle stops, is that the speed is zero and the parking brake is ON; however, other condition may be used, for example, a predetermined time elapses from stopping and the like.

The no-distortion image behind the vehicle may be displayed only in the case where information of a steering angle of a steering device that changes a moving direction of the vehicle is also inputted as the vehicle information and a judgment can be made that the vehicle is in a moving state and goes almost straight from the steering angle. In the case where the steering angle is large and the vehicle moves while turning, the vehicle may avoid an obstacle near the vehicle; and therefore, the wide-angle image, which easily grasps whether or not the vehicle can avoid the obstacle, is preferable.

The vehicle information acquisition section acquires the movement distance of the vehicle at one cycle from the electronic control unit; however, only the speed is acquired and the movement distance at one cycle may be found by trapezoidal approximation using previous and current speed and the time of one cycle. The acceleration may be outputted by the electronic control unit or may be found from the previous and the current speed in the vehicle information acquisition section. The vehicle information acquisition section may be of any form as long as acquiring the vehicle state necessary for the driving assist apparatus.

The above-mention is also applicable to other embodiments.

Embodiment 2

The description has been made on the case where a vehicle is made to move backward and park in the driving assist system according to Embodiment 1; however, there is a case where a vehicle is made to move forward and park. When the vehicle is made to move forward and park, a driver can directly visually check circumstances surrounding the vehicle in the case of a small-size car; and therefore, the driving assist apparatus is not needed particularly. However, in the case of a large-size car provided with a driving seat at a high position, circumstances in front of the vehicle are also difficult to be confirmed from the driving seat; and therefore, the driving assist apparatus is highly needed. Therefore, a driving assist system according to Embodiment 2 judges a state of a vehicle and switches a camera image to be displayed when the vehicle is made to move and park. Furthermore, a configuration is made such that a guide line image is not displayed on the road surface.

Figure 13:
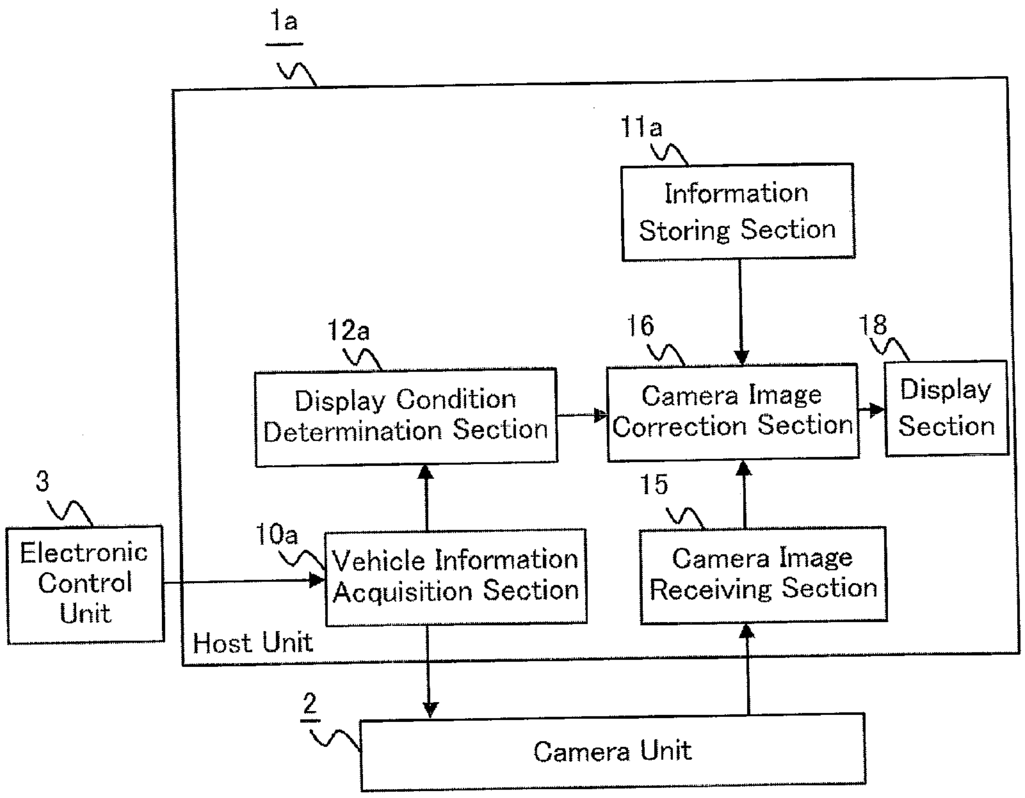
FIG. 13 is a block diagram showing the configuration of a driving assist system according to Embodiment 2.

FIG. 13 is a block diagram showing the configuration of the driving assist system according to Embodiment 2. Only points different from FIG. 1 that is the configuration in the case of Embodiment 1 will be described. In FIG. 13, the driving assist system is configured by including a host unit 1*a* serving as a driving assist apparatus and a camera unit 2.

The host unit 1*a* does not have a guide line calculation section 13 (guide line information generation section), a line drawing section 14 (guide line image generation section), and an image superimposing section 17. Therefore, an image outputted by a camera image correction section 16 is displayed on a display section 18, and the camera image correction section 16 constitutes an image output section.

Angle of view information, projection information, lens distortion information, and viewpoint information are stored in an information storing section 11*a*. A vehicle information acquisition section 10*a* acquires gear state information showing a state of a transmission of the vehicle (gear state), speed information showing the speed of the vehicle, and movement distance information showing a movement distance of the vehicle at one cycle at which vehicle information is detected.

A display condition determination section 12*a* (vehicle state judgment section) generates display condition information which makes the display section 18 display the camera image in what way based on the vehicle information acquired by the vehicle information acquisition section 10*a*.

The camera unit 2 has a camera set at a position capable of imaging a portion which is in front of the vehicle and cannot be seen from the driving seat. When the gear state acquired by the vehicle information acquisition section 10*a* of the host unit 1*a* is a state that can move forward, for example, in the case of any of low (L), second (S), drive (D), and neutral (N); the host unit 1*a* controls the camera of the camera unit 2 so as to image and transmit the camera image. The gear state which is a state that can move forward is referred to as a forward gear (abbreviated as Fw).

Figure 14:
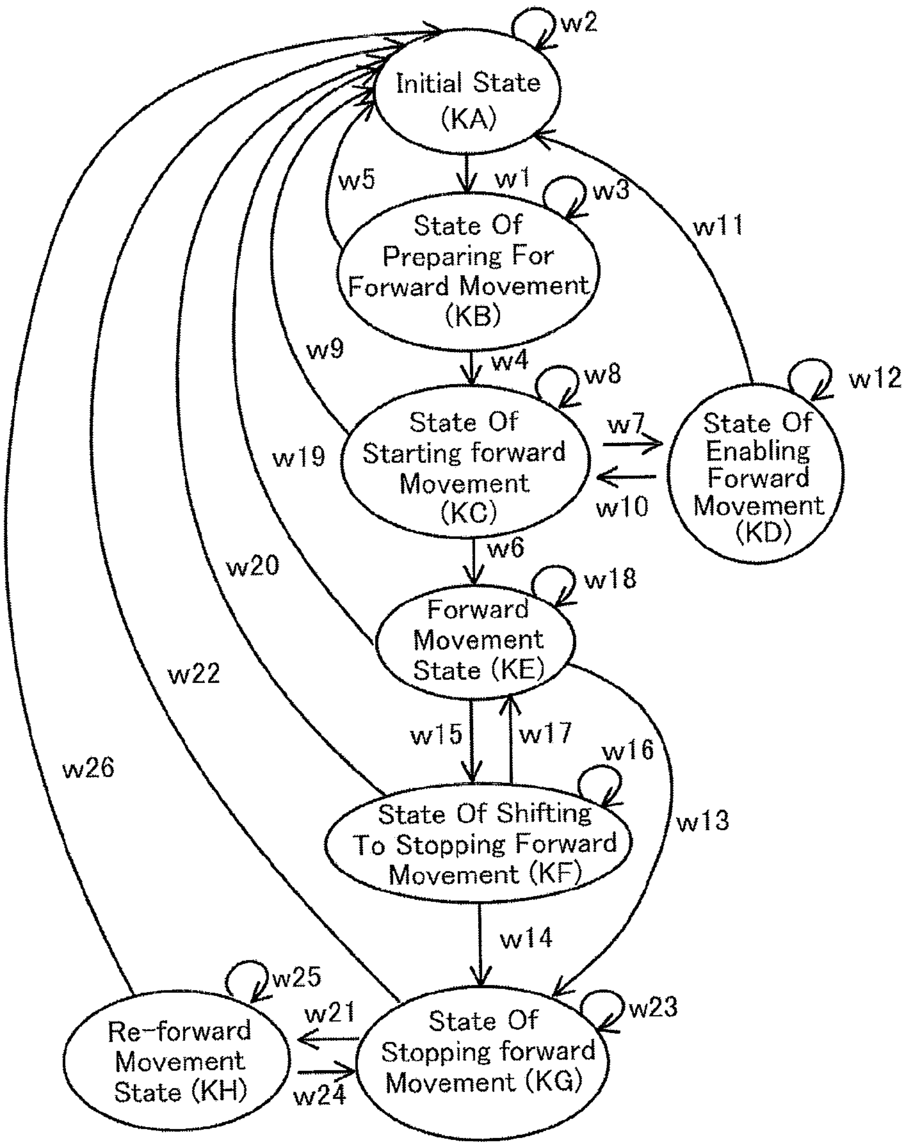
FIG. 14 is a diagram for explaining changes in vehicle state recognized by a display condition determination section of the driving assist system according to Embodiment 2.

Description will be made how the display condition determination section 12*a* operates when the vehicle is made to move forward and park. FIG. 14 is a diagram for explaining changes in vehicle state recognized by the display condition determination section 12*a*.

The vehicle state recognized by the display condition determination section 12*a* includes the following states. Incidentally, the speed of the vehicle is regarded as positive when the vehicle moves in a forward direction.

Initial state (KA): A state other than the below mention. When an engine of the vehicle starts, the vehicle state becomes an initial state, which is not a state to be assisted by the driving assist apparatus. When the gear state is not the forward gear and a speed V is equal to or more than a predetermined speed (Vr1), the vehicle state returns to the initial state (KA).

Although the below mention is not all of the condition that is the initial state (KA), it can be judged as the initial state (KA) when the below-mentioned condition is satisfied. A below-mentioned condition $C_{KA}$ is referred to as a condition that is a clearly initial state during forward movement.

$C_{KA}$=(speed V is negative), or
  (speed V is equal to or more than predetermined speed (Vr1)), or
  (gear state is other than forward gear).

State of preparing for forward movement (KB): A state of preparing for forward movement. A condition $C_{KB}$ for a state of preparing for forward movement (KB) is as follows.

$C_{KB}$=(gear state is forward gear), and
  (movement distance L is zero), and
  (speed V is zero).

State of starting forward movement (KC): A state until the vehicle moves a predetermined distance from starting forward movement. When the speed V is positive in the state of preparing for forward movement (KB), the vehicle state becomes a state of starting forward movement.

$C_{KC}$=(gear state is forward gear), and
  (movement distance L is positive and less than predetermined distance (L1)), and
  (speed V is positive and less than predetermined speed (Vr1)).

State of enabling forward movement (KD): A state until the vehicle moves a predetermined distance from starting forward movement and where the vehicle stops, and a predetermined time (Tz1) does not elapse from stopping.

$C_{KD}$=(gear state is forward gear), and
  (movement distance L is positive and less than predetermined distance (L1)), and
  (speed V is zero), and
  (duration time (Tz) at which speed V is zero is less than predetermined time (Tz1)).

Incidentally, if equal to or more than the predetermined time (Tz1) elapses from stopping, the vehicle state is set to the initial state (KA).

Forward movement state (KE): A state where forward movement continues even when moving equal to or more than the predetermined distance (L1) from starting the forward movement and a condition of low speed which is a condition of detecting shifting to stopping is not established. When the condition of low speed is established, the vehicle state is set to a next state of shifting to stopping forward movement (KF). The condition of low speed is that the speed V being less than a predetermined speed (Vr2, Vr2<Vr1) continues for a predetermined time (Tv2). The reason to provide a condition of duration time for the speed V being less than the predetermined speed (Vr2) is to prevent the forward movement state (KE) and the state of shifting to stopping forward movement (KF) from frequently switching at a short interval when fluctuation between equal to or more than and less than the predetermined speed (Vr2) in speed V is frequently generated.

When the vehicle moves equal to or more than the predetermined distance (L1) without becoming the speed V being equal to or more than the predetermined speed (Vr2), the vehicle state is the forward movement state (KE) until the predetermined time (Tv2) from detecting moving of equal to or more than the predetermined distance (L1).

$C_{KE}$=(gear state is a forward gear), and
(movement distance L is equal to or more than predetermined distance (L1)), and
(speed V is positive and less than predetermined speed (Vr1)), and
(condition of low speed $C_{lw}$ is not established).

$C_{lw}$=(speed V is less than predetermined speed (Vr2)), and
(duration time (Tv) at which speed V is less than predetermined speed (Vr2) is equal to or more than predetermined time (Tv2)).

State of shifting to stopping forward movement (KF): A state where forward movement continues with the condition of low speed established after becoming the forward movement state (KE).

$C_{KF}$=(gear state is forward gear), and
(movement distance L is equal to or more than predetermined distance (L1)), and
(speed V is positive and less than predetermined speed (Vr1)), and
(condition of low speed $C_{lw}$ is established).

State of stopping forward movement (KG): A state where the vehicle stops after becoming the forward movement state (KE) and the predetermined time (Tz1) does not elapse from stopping.

$C_{KG}$=(Speed V is zero), and
(gear state is forward gear), and
(duration time (Tz) at which speed V is zero is less than predetermined time (Tz1)).

Re-forward movement state (KH): A state where the vehicle moves forward after a state of stopping forward movement (KG).

$C_{KH}$=(gear state is forward gear), and
(speed V is positive and less than predetermined speed (Vr1)), and
(movement distance L is equal to or more than predetermined distance (L1)).

With respect to such vehicle states, the display condition determination section **12*a*** determines display conditions as follows.

(1) In the state of preparing for forward movement (KB), the state of starting forward movement (KC), and the state of enabling forward movement (KD), the display condition is a first display condition. The camera image is an image directly imaged by the camera and has lens distortion and distortion by a projection system. A lens of the camera of the camera unit 2 is so-called a fisheye lens having an angle of view of equal to or more than 180 degrees; and therefore, the camera image displays a wide range including the periphery of an installation location of the camera, easily grasps circumstances surrounding the vehicle, and suits to confirm whether or not there is a pedestrian around the vehicle at the time of starting the vehicle.

In this case, the state of preparing for forward movement (KB) and the state of enabling forward movement (KD) are a state of preparing for movement which is a state where the vehicle is movable and stops. In this embodiment, a predetermined condition during movement which judges that the vehicle is a state during movement is regarded as that the vehicle moves the predetermined distance (L1). The state of starting forward movement (KC) which is a state until the vehicle moves the predetermined distance (L1) and where the vehicle moves forward is a state of starting movement.

(2) In the forward movement state (KE), the display condition is a second display condition. The camera image in which the lens distortion and the distortion by the projection system are eliminated is displayed. An image in a rectangular coordinate system, which is susceptible to grasping a sense of distance, is made; and therefore, the image is an image suitable for during forward movement, which is important to grasp the sense of distance.

The forward movement state (KE) in which the vehicle moves forward after moving the predetermined distance (L1) is the state during movement, which is the state where the vehicle moves after the condition during movement is established.

(3) In the state of shifting to stopping forward movement (KF) and the state of stopping forward movement (KG), the display condition is a third display condition. A viewpoint after performing viewpoint transformation is located at, for example, a predetermined position where the front end center of the vehicle is positioned at an end of the image and a predetermined height (for example, 5 m), and the viewpoint faces straight down. The camera image performed by the viewpoint transformation to this viewpoint becomes an image in which the road surface in front of the vehicle is seen from directly overhead, and becomes an image in which the angle between directions parallel or perpendicular to the vehicle is seen as a right angle and a sense of distance near an actual distance in a horizontal direction and a vertical direction can be grasped; and therefore, the positional relationship of the vehicle on the road surface is easily grasped.

The state of shifting to stopping forward movement (KF) is a state of shifting to stopping which is a state that detects that a predetermined condition of detecting shifting to stopping (in this embodiment, the condition of low speed $C_{lw}$), which detects that the vehicle starts to stop, is established. The state of stopping forward movement (KG) is a stop state that is a state where the vehicle stops after the state of shifting to stopping.

(4) In the re-forward movement state (KH), a display is made in the first display condition so as to display a front wide range of the vehicle during a period of time of confirming circumstances of a movement direction of approximately several seconds after changing to the state. After that, a display is made in the third display condition similar to the stop state.

The re-forward movement state (KH) is a re-movement state that is a state where the vehicle moves after the stop state.

The initial state (KA) is not a state to be assisted by the driving assist apparatus of the present invention; and therefore, a screen of a navigation device is displayed on a display device. When returned to the initial state (KA) after becoming the state of preparing for forward movement (KB), a screen displayed before becoming the state of preparing for forward movement (KB) or a screen determined by the state at the time when returned to the initial state (KA) is displayed. Incidentally, a screen in a state just before changing to the initial state (KA) may be displayed until a phenomenon which changes the display of the screen is generated.

Figure 15:
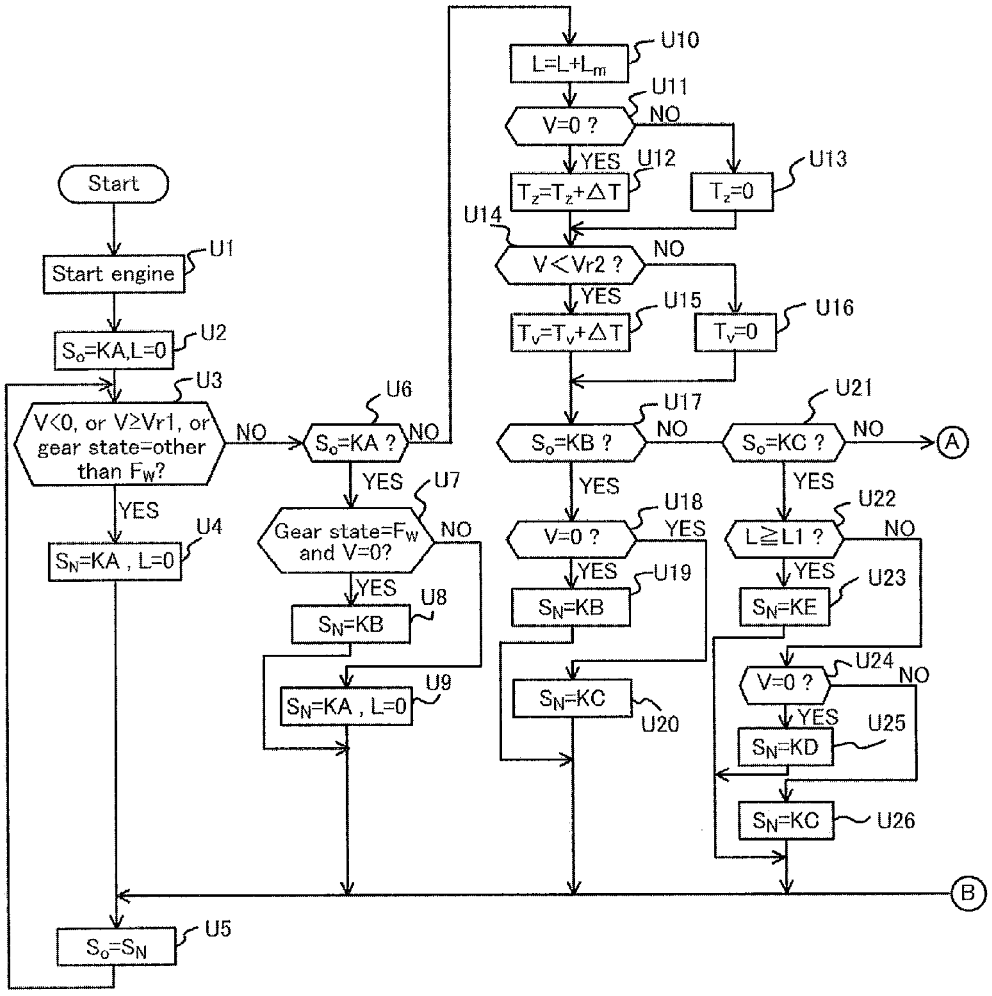
FIG. 15 is a flow chart for explaining operation which judges vehicle states in the display condition determination section of the driving assist system according to Embodiment 2.
Figure 16:
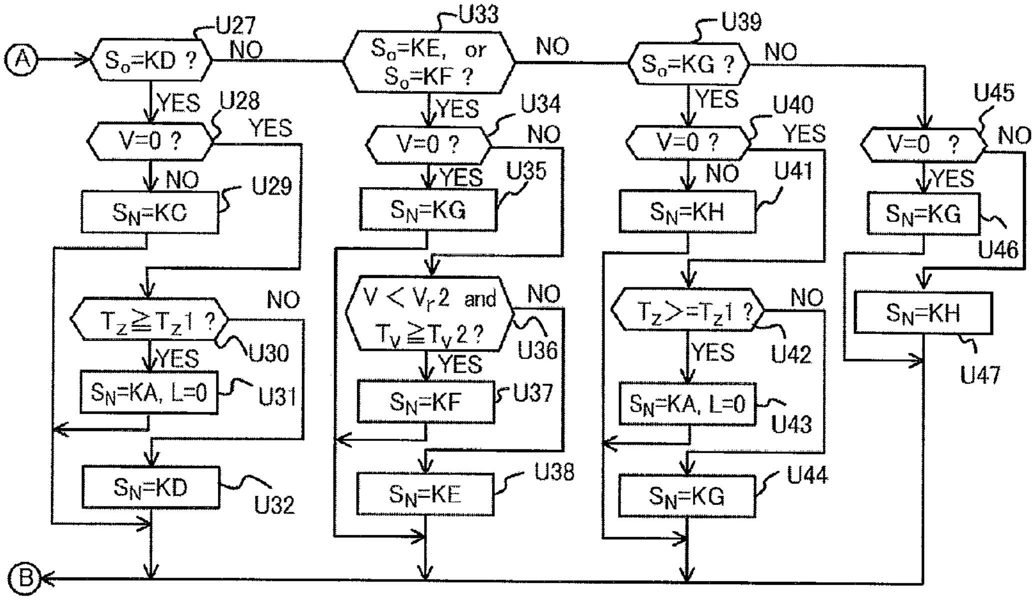
FIG. 16 is a flow chart for explaining operation which judges vehicle states in the display condition determination section of the driving assist system according to Embodiment 2.

FIG. 15 and FIG. 16 are each a flow chart for explaining operation which judges vehicle states in the display condition determination section 12*a*. Description will be made below with reference to FIG. 15 and FIG. 16, including relationship to the drawing for explaining changes in state of FIG. 14.

First, when the engine of the vehicle starts in Ul, the display condition determination section 12*a* sets a vehicle state ($S_O$) to the initial state (KA) in U2. Thereafter, processing after U3 is repeatedly executed at a cycle (ΔT) in which the vehicle information is inputted from an ECU and a new vehicle state ($S_N$) is determined. In U3, a check is made whether or not the condition $C_{KA}$ that is clearly the initial state during forward movement is established. When $C_{KA}$ is established, $S_N$ is set to the initial state (KA) and a movement distance L is set to L=0 (all arrows entering to the initial state (KA) of FIG. 14) in U4. Before returning to U3, the vehicle state is set to $S_O$=$S_N$ in U5.

When $C_{KA}$ is not established in U3, a check is made whether or not $S_O$ is the initial state (KA) in U6. Incidentally, when C. is not established, the speed V is equal to or more than zero and less than the predetermined speed (Vr1), and the gear state is the forward gear.

(1) Processing in the Initial State (KA)

When $S_O$ is the initial state (KA) in U6, a check is made whether or not the condition $C_{KB}$ is established in U7. When $C_{KB}$ is established, $S_N$ is set to the state of preparing for forward movement (KB) (an arrow w1 of FIG. 14) in U8. When $C_{KB}$ is not established, $S_N$ is set to the initial state (KA) and the movement distance L is set to L=0 (an arrow w2 of FIG. 14) in U9.

When $S_O$ is not the initial state (KA) in U6, necessary information is calculated for judging the vehicle state in U10 to U16. A movement distance Lm from the previous processing point, which is acquired from the vehicle information, is added to the movement distance L (L=L+Lm) in U10. A check is made whether or not the speed V is zero in U11. When the speed V is zero, a time of one cycle (ΔT) is added to the duration time (Tz) (Tz=Tz+ΔT) in U12. When the speed V is not zero, the duration time (Tz) at which the speed V is zero is set to zero (Tz=0) in U13. Further, a check is made whether or not the speed V is less than the predetermined speed (Vr2) (V<Vr2) in U14. When the speed V is less than the predetermined speed (Vr2), a time of one cycle (ΔT) is added to the duration time (Tv) at which the speed V is less than the predetermined speed (Vr2) (Tv=Tv+ΔT) in U15. When the speed V is not less than the predetermined speed (Vr2), the duration time (Tv) at which the speed V is less than the predetermined speed (Vr2) is set to zero (Tv=0) in U16.

A check is made whether or not $S_O$ is the state of preparing for forward movement (KB) in U17.

(2) Processing in the State of Preparing for Forward Movement (KB)

When $S_O$ is the state of preparing for forward movement (KB) in U17, a check is made whether or not the speed V is zero in U18. When the speed V is zero, $S_N$ is set to the state of preparing for forward movement (KB) in U19 (an arrow w3 of FIG. 14). When the speed V is not zero, $S_N$ is set to the state of starting forward movement (KC) in U20 (an arrow w4 of FIG. 14).

When $S_O$ is not the state of preparing for forward movement (KB) in U17, a check is made whether or not $S_O$ is the state of starting forward movement (KC) in U21.

(3) Processing in the State of Starting Forward Movement (KC)

When $S_O$ is the state of starting forward movement (KC) in U21, a check is made whether or not the movement distance L is equal to or more than the predetermined distance L1 (L≥L1) in U22. When is established, $S_N$ is set to the forward movement state (KE) in U23 (an arrow w6 of FIG. 14). When L<L1 is established, a check is made whether or not the speed V is zero (V=0) in U24. When the speed V is zero, $S_N$ is set to the state of enabling forward movement (KD) in U25 (an arrow w7 of FIG. 14). When the speed V is not zero, $S_N$ is set to the state of starting forward movement (KC) in U26 (an arrow w8 of FIG. 14).

When $S_O$ is not the state of starting forward movement (KC) in U21, a check is made whether or not $S_O$ is the state of enabling forward movement (KD) in U27.

(4) Processing in the state of enabling forward movement (KD) When $S_O$ is the state of enabling forward movement (KD) in U27 shown in FIG. 16, a check is made whether or not the speed V is zero (V=0) in U28. When the speed V is not zero, $S_N$ is set to the state of starting forward movement (KC) in U29 (an arrow w10 in FIG. 14). When the speed V is zero, a check is made whether or not the elapsed time (Tz) at which the speed V is zero is equal to or more than the predetermined value (Tz1) (Tz>Tz1) in U30. When Tz>Tz1 is established, $S_N$ is set to the initial state (KA) and the movement distance L is set to L=0 in U31 (an arrow w11 of FIG. 14). When Tz<Tz1 is established, $S_N$ is set to the state of enabling forward movement (KD) in U32 (an arrow w12 of FIG. 14).

When $S_O$ is not the state of enabling forward movement (KD) in U27, a check is made whether or not $S_O$ is the forward movement (KE) in U33.

(5) Processing in the Forward Movement State (KE) or the State of Shifting to Stopping Forward Movement (KF)

When $S_O$ is the forward movement state (KE) or the state of shifting to stopping forward movement (KF) in U33, a check is made whether or not the speed V is zero (V=0) in U34. When the speed V is zero, $S_N$ is set to the state of stopping forward movement (KG) in U35 (arrows w13, w14 of FIG. 14). When the speed V is not zero, a check is made whether or not the condition of low speed $C_{lw}$ is established in U36. When $C_{lw}$ is established, $S_N$ is set to the state of shifting to stopping forward movement (KF) in U37 (arrows w15, w16 of FIG. 14). When $C_{lw}$ is not established, $S_N$ is set to the forward movement state (KE) in U38 (arrows w17, w18 of FIG. 14).

When $S_O$ is not the forward movement state (KE) or the state of shifting to stopping forward movement (KF) in U33, a check is made whether or not $S_O$ is the state of stopping forward movement (KG) in U39.

(6) Processing in the State of Stopping Forward Movement (KG)

When $S_O$ is the state of stopping forward movement (KG) in U39, a check is made whether or not the speed V is zero (V=0) in U40. When the speed V is not zero, $S_N$ is set to the re-forward movement state (KH) in U41 (an arrow w21 of FIG. 14). When the speed V is zero, a check is made whether or not the elapsed time Tz at which the speed V is zero is equal to or more than the predetermined value Tz1 (Tz≥Tz1) in U42. When Tz≥Tz1 is established, $S_N$ is set to the initial state (KA) and the movement distance L is set to L=0 (an arrow w22 of FIG. 14) in U43. When Tz<Tz1 is established, $S_N$ is set to the state of stopping forward movement (KG) in U44 (an arrow w23 of FIG. 14).

When $S_O$ is not the state of stopping forward movement (KG) in U39, the vehicle state is the re-forward movement state (KH).

(7) Processing in the Re-Forward Movement State (KH)

When $S_O$ is the re-forward movement state (KH), a check is made whether or not the speed V is zero in U45. When the speed V is zero, $S_N$ is set to the state of stopping forward movement (KG) in U46 (an arrow w24 of FIG. 14). When the speed V is not zero, $S_N$ is set to the re-forward movement state (KH) in U47 (an arrow w25 of FIG. 14).

In this way, from the state of the transmission (gear state), the speed V, and the movement distance L, a judgment is made as to what state the vehicle is in; that is, a judgment is made as to which state the vehicle is in any of the state of preparing for forward movement (KB), the state of starting forward movement (KC), the state of enabling forward movement (KD), the forward movement state (KE), the state of shifting to stopping forward movement (KF), the state of stopping forward movement (KG), the re-forward movement state (KH), and the initial state (KA). A camera image suitable for assisting the driver can be displayed according to the judged vehicle state. More specifically, in the state of preparing for forward movement (KB) and the state of starting forward movement (KC), the camera image (with distortion) of a wide range due to the fisheye lens is displayed; and therefore, surrounding circumstances is easily confirmed at the time of starting forward movement. An image in which the lens distortion and the distortion by the projection system are eliminated is displayed in the forward movement state (KE); and therefore, a sense of distance is easily grasped and forward movement can be easily performed to an appropriate position. An image in which the lens distortion and the distortion by the projection system are eliminated and which is seen from above the vehicle in the state of shifting to stopping forward movement (KF), the state of stopping forward movement (KG), and the state of stopping forward movement (KG); and therefore, the positional relationship of the vehicle on the road surface is easily grasped.

In this case, the description has been made on the case where the vehicle state changes until the state of stopping forward movement (KG); however, even in the case where the vehicle state changes to the initial state (KA) before becoming the state of shifting to stopping forward movement (KF), the camera image of the wide range due to the fisheye lens is displayed at the time of starting forward movement; and therefore, surrounding circumstances is easily confirmed at the time of starting forward movement. When the vehicle state changes from the forward movement state (KE) to the initial state (KA), an image in which distortion is eliminated and the sense of distance is easily grasped is displayed during forward movement; and therefore, forward movement can be easily performed to an appropriate position.

The image is displayed so that the driver easily grasps the circumstances of the road surface in a moving direction when the vehicle moves backward in Embodiment 1 and when the vehicle moves forward in Embodiment 2. When the vehicle starts movement either backward or forward, the road surface in the moving direction may be displayed in an appropriate manner according to the vehicle state.

In the embodiments described so far, the driver is assisted only when the vehicle moves in the same direction as the direction before stopping when the vehicle stops movement and then moves again. The driver may also be assisted when the vehicle moves in a different direction from the direction before stopping when the vehicle stops movement and then moves again.

The above-mention is also applicable to other embodiments.

Embodiment 3

Figure 17:
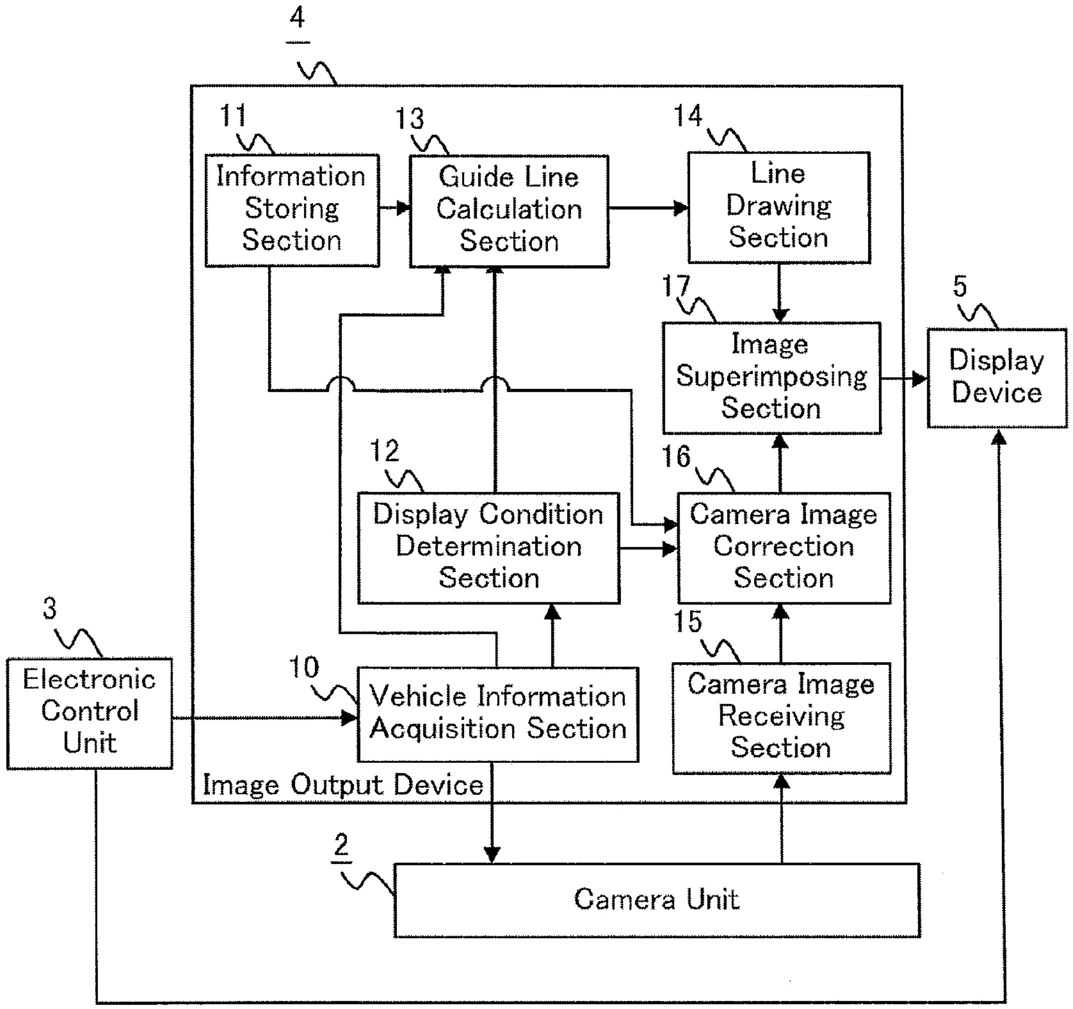
FIG. 17 is a block diagram showing the configuration of a driving assist system according to Embodiment 3.

In Embodiments 1 and 2, the host unit includes the display section; however, a configuration may also be made such that an image output device 4, which outputs a synthesized image in which a guide line image is superimposed on a camera image, is combined with an external display device 5, for example, a vehicle-mounted navigation device to display on the display device 5 the synthesized image outputted by the image output device 4. In this embodiment, the image output device 4 is a driving assist apparatus. FIG. 17 is a block diagram showing the configuration of a driving assist system according to Embodiment 3. The same reference numerals are given to those which are identical or corresponding to constitutional elements in FIG. 1 and their description will be omitted. In FIG. 17, gear state information is outputted from an electronic control unit 3 to a vehicle information acquisition section 10 and the display device 5. A connection interface with the electronic control unit 3 in the image output device 4 is the same as that of a general navigation device; and therefore, communication between the image output device 4 and the electronic control unit 3 can be performed without preparing for a special interface. An image signal outputted by the image output device 4 is inputted to an external input terminal of the display device 5.

The display device 5 switches to a mode for displaying an image inputted to the external input terminal and displays the image outputted from the image output device 4 while the gear state information in which a gear state of a vehicle is reverse is inputted from the electronic control unit 3. Therefore, when a driver of the vehicle shifts the transmission to reverse, the synthesized image is outputted from the image output device 4 to display the synthesized image on the display device 5. In this way, an image of the road surface behind the vehicle is displayed during parking; and accordingly, the parking can be assisted.

Incidentally, the above-mentioned display device 5 displays the image outputted from the image output device 4 when the gear state information in which the gear state of the vehicle is reverse is inputted from the electronic control unit 3. In addition to this, a changeover switch for switching to the mode for displaying the image inputted to the external input terminal of the display device 5 is provided on the display device 5 and the image outputted from the image output device 4 may be displayed when a user pushes the changeover switch. This is also applicable to other embodiments.

Embodiment 4

In Embodiment 1, the host unit determines the display condition based on the vehicle state and synthesizes the camera image transmitted from the camera unit and the guide line image. The vehicle information acquisition section, the display condition determination section, and the camera image correction section can be incorporated in the camera unit. The camera unit that outputs the image in an appropriate display condition according to the vehicle state based on the imaged camera image is referred to as a driving assist camera unit. In this Embodiment 4, the driving assist camera unit and a display device that displays an image outputted by the driving assist camera unit are combined to constitute a driving assist system.

The driving assist camera unit in this embodiment also has a configuration for generating a guide line image, such as an information storing section, a guide line calculation section, and a line drawing section; and the driving assist camera unit outputs a synthesized image in which the guide line image is superimposed on a camera image.

Figure 18:
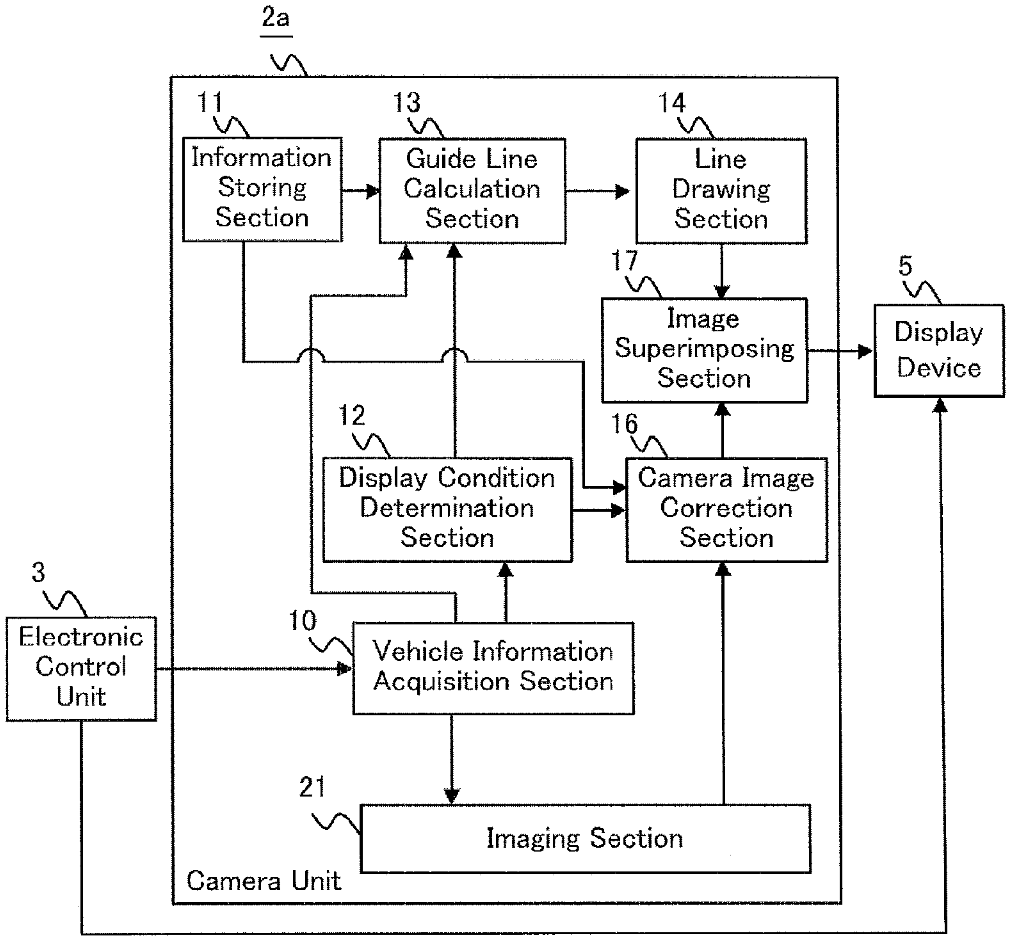
FIG. 18 is a block diagram showing the configuration of a driving assist system according to Embodiment 4.

FIG. 18 is a block diagram showing the configuration of the driving assist system according to Embodiment 4. In FIG. 18, the same reference numerals are given to those which are identical or corresponding to constitutional elements in FIG. 17 and their description will be omitted. An imaging section 21 of a camera unit 2*a* images the road surface behind a vehicle during receiving gear state information, in which a gear state of the vehicle is reverse, from a vehicle information acquisition section 10. A camera image imaged by the imaging section 21 is outputted to a camera image correction section 16. The camera image correction section 16 corrects the camera image as in Embodiment 1 and the like. An image superimposing section 17 outputs a synthesized image in which the image outputted by the camera image correction section 16 and the guide line image outputted by the line drawing section 14 are superimposed. An image signal outputted by the camera unit 2a is inputted to an external input terminal of a display device 5.

The display device 5 in this embodiment also switches to a mode for displaying an image inputted to the external input terminal while the gear state information in which a gear state of a vehicle is reverse is inputted from the electronic control unit 3, as in the case of Embodiment 3. Therefore, the image for assisting driving is displayed on the display device 5 when a transmission of the vehicle is in a reverse state according to the operation of a driver of the vehicle.

DESCRIPTION OF REFERENCE NUMERALS

1, 1*a* Host unit (Driving assist apparatus)
2 Camera unit (Camera)
2*a* Camera unit (Driving assist camera unit)
3 Electronic control unit
4 Image output device (Driving assist apparatus)
5 Display device
10 Vehicle information acquisition section
11 Information storing section (Guide line information storing section)
11*a* Information storing section
12, 12*a* Display condition determination section (Vehicle state judgment section)
13 Guide line calculation section (Guide line information generation section)
14 Line drawing section (Guide line image generation section)
15 Camera image receiving section
16 Camera image correction section (Image generation section)
17 Image superimposing section
18 Display section (Display device)
21 Imaging section (Camera)

The invention claimed is:

1. A driving assist apparatus which is connected to a camera attached to a vehicle and having a wide-angle lens for imaging a road surface in a direction in which said vehicle moves, and displays on a display device an image based on a camera image that is an image imaged by said camera, said driving assist apparatus comprising:

an information storing section which stores information for generating images, the information including lens distortion information that shows distortion of the camera image due to a lens shape of said camera and projection information that shows distortion of the camera image by a projection system of said wide-angle lens;

a vehicle information acquisition section which acquires vehicle information including a gear state that is a state of a transmission of said vehicle and speed;

a vehicle state judgment section which judges a vehicle state that is a state of said vehicle based on the vehicle information; and an image generation section which processes the camera image according to the vehicle state using the information for generating images, and generates an image to be displayed on said display device, wherein said vehicle state judgment section judges: a state of preparing for movement, which is a state where said vehicle is movable and stops; a state of starting movement, which is a state until a predetermined condition during movement is established from starting movement and where said vehicle moves; and a state during movement, which is a state where said vehicle moves after the condition during movement is established, as the vehicle state, and said image generation section generates a wide-angle image that is an image that can see a wide range although having distortion when the vehicle state is the state of preparing for movement or the state of starting movement, and generates a no-distortion image that is an image in which the distortion due to the lens shape and the distortion by the projection system are eliminated from the camera image when the vehicle state is the state during movement.

2. The driving assist apparatus according to claim 1, wherein said information storing section stores viewpoint information composed of parallel movement information, which is a difference between a position of a viewpoint present at a different position from said camera and an attachment position of said camera, and rotation information, which is a difference between a direction of the viewpoint and a direction in which said camera is attached;

said vehicle state judgment section judges a state of shifting to stopping which is a state that detects that a predetermined condition of detecting shifting to stopping, which detects that said moving vehicle starts to stop, is established; and said image generation section generates a different viewpoint no-distortion image, which is an image in which the distortion due to the lens shape and the distortion by the projection system are eliminated from the camera image and which is seen from the viewpoint when the vehicle state is the state of shifting to stopping.

3. The driving assist apparatus according to claim 2, wherein said vehicle state judgment section judges a stop state that is a state in which said vehicle stops after the state of shifting to stopping; and said image generation section generates the different viewpoint no-distortion image when the vehicle state is the stop state.

4. The driving assist apparatus according to claim 3, wherein said vehicle state judgment section judges a re-movement state that is a state where said vehicle moves after the stop state; and said image generation section generates the wide-angle image for a predetermined period of time of confirming circumstances of a movement direction after the vehicle state becomes the re-movement state.

5. The driving assist apparatus according to claim 4, wherein said image generation section generates the different viewpoint no-distortion image when the vehicle state is the re-movement state after the period of time of confirming circumstances of the movement direction.

6. The driving assist apparatus according to claim 4, wherein said vehicle state judgment section judges the re-movement state when said vehicle moves until a predetermined condition of determining stopping is established, and judges the state of preparing for movement, the state of starting movement, and the state during movement after the condition of determining stopping is established.

7. The driving assist apparatus according to claim 5, wherein said vehicle state judgment section judges the re-movement state when said vehicle moves until a predetermined condition of determining stopping is established, and judges the state of preparing for movement, the state of starting movement, and the state during movement after the condition of determining stopping is established.

8. The driving assist apparatus according to claim 1, further comprising: a guide line information storing section which stores guide line spacing information on spacing of guide lines set on the road surface in the direction in which said vehicle moves, and attachment information that shows an attachment position and an attachment angle of said camera to said vehicle;

a guide line information generation section which generates guide line information on the position of an image of the guide lines set on the road surface based on the information stored in said guide line information storing section, the image being generated by said image generation section; and a guide line image generation section which generates a guide line image that represents the guide lines based on the guide line information, said display device displaying an image in which the guide line image is superimposed on the image generated by said image generation section.

9. A driving assist system comprising:

a camera attached to a vehicle and having a wide-angle lens for imaging a road surface in a direction in which said vehicle moves; and a driving assist apparatus being connected to said camera and displaying on a display device an image based on a camera image imaged by said camera, said driving assist apparatus comprising:

an information storing section which stores information for generating images, the information including lens distortion information that shows distortion of the camera image due to a lens shape of said camera and projection information that shows distortion of the camera image by a projection system of said wide-angle lens;

a vehicle information acquisition section which acquires vehicle information including a gear state that is a state of a transmission of said vehicle and speed;

a vehicle state judgment section which judges a vehicle state that is a state of said vehicle based on the vehicle information; and an image generation section which processes the camera image according to the vehicle state using the information for generating images, and generates an image to be displayed on said display device, wherein said vehicle state judgment section judges: a state of preparing for movement, which is a state where said vehicle is movable and stops; a state of starting movement, which is a state until a predetermined condition during movement is established from starting movement and where said vehicle moves; and a state during movement, which is a state where said vehicle moves after the condition during movement is established, as the vehicle state, and said image generation section generates a wide-angle image that is an image that can see a wide range although having distortion when the vehicle state is the state of preparing for movement or the state of starting movement, and generates a no-distortion image that is an image in which the distortion due to the lens shape and the distortion by the projection system are eliminated from the camera image when the vehicle state is the state during movement.

10. A driving assist camera unit which images an image of a road surface in a direction in which a vehicle moves, and displays on a display device an image based on an imaged camera image, said driving assist camera unit comprising:

a camera attached to said vehicle and having a wide-angle lens for imaging the road surface;

an information storing section which stores information for generating images, the information including lens distortion information that shows distortion of the camera image due to a lens shape of said camera and projection information that shows distortion of the camera image by a projection system of said wide-angle lens;

a vehicle information acquisition section which acquires vehicle information including a gear state that is a state of a transmission of said vehicle and speed;

a vehicle state judgment section which judges a vehicle state that is a state of said vehicle based on the vehicle information; and an image generation section which processes the camera image according to the vehicle state using the information for generating images, and generates an image to be displayed on said display device, wherein said vehicle state judgment section judges: a state of preparing for movement, which is a state where said vehicle is movable and stops; a state of starting movement, which is a state until a predetermined condition during movement is established from starting movement and where said vehicle moves; and a state during movement, which is a state where said vehicle moves after the condition during movement is established, as the vehicle state, and said image generation section generates a wide-angle image that is an image that can see a wide range although having distortion when the vehicle state is the state of preparing for movement or the state of starting movement, and generates a no-distortion image that is an image in which the distortion due to the lens shape and the distortion by the projection system are eliminated from the camera image when the vehicle state is the state during movement.

* * * * *